United States Patent
He et al.

(10) Patent No.: US 11,936,989 B2
(45) Date of Patent: Mar. 19, 2024

(54) APPARATUSES, SYSTEMS, AND METHODS FOR GAZE-BASED AUTO-EXPOSURE MANAGEMENT OF IMAGE FRAMES

(71) Applicant: Intuitive Surgical Operations, Inc., Sunnyvale, CA (US)

(72) Inventors: Zhen He, Cupertino, CA (US); Jeffrey M. DiCarlo, Austin, TX (US); Heath Feather, Cupertino, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 170 days.

(21) Appl. No.: 17/369,688

(22) Filed: Jul. 7, 2021

(65) Prior Publication Data
US 2022/0014664 A1  Jan. 13, 2022

Related U.S. Application Data

(60) Provisional application No. 63/050,606, filed on Jul. 10, 2020.

(51) Int. Cl.
*H04N 23/73* (2023.01)
*H04N 23/62* (2023.01)
*H04N 23/741* (2023.01)

(52) U.S. Cl.
CPC .......... *H04N 23/73* (2023.01); *H04N 23/62* (2023.01); *H04N 23/741* (2023.01)

(58) Field of Classification Search
CPC ...... H04N 23/73; H04N 23/62; H04N 23/741; H04N 23/611; H04N 23/71; H04N 23/72; H04N 23/74; H04N 23/75; H04N 23/76; H04N 23/555
See application file for complete search history.

(56) References Cited

U.S. PATENT DOCUMENTS

| | | | |
|---|---|---|---|
| 9,313,415 B2 | 4/2016 | Schieltz | |
| 2021/0110190 A1 | 4/2021 | Park et al. | |
| 2021/0271880 A1* | 9/2021 | Park | G06V 20/20 |

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

* cited by examiner

*Primary Examiner* — Twyler L Haskins
*Assistant Examiner* — Angel L Garces-Rivera

(57) ABSTRACT

An illustrative apparatus may perform gaze-based auto-exposure management of image frames. For example, the apparatus may determine, for an image frame within an image frame sequence captured by an image capture system, auto-exposure values for pixel units into which the image frame is divided. The apparatus may then assign weight values to the pixel units based on a gaze direction of a viewer viewing the image frame sequence. Based on the auto-exposure values determined for the pixel units and the weight values assigned to the pixel units, the apparatus may update one or more auto-exposure parameters for use by the image capture system to capture an additional image frame within the image frame sequence. Corresponding apparatuses, systems, and methods for gaze-based auto-exposure management of image frames are also disclosed.

20 Claims, 11 Drawing Sheets

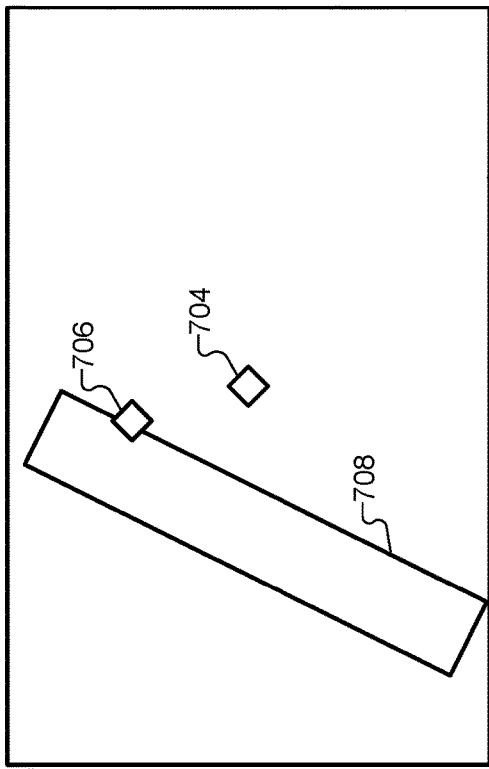

APPARATUSES, SYSTEMS, AND METHODS FOR GAZE-BASED AUTO-EXPOSURE MANAGEMENT OF IMAGE FRAMES

RELATED APPLICATIONS

The present application claims priority to U.S. Provisional Patent Application No. 63/050,606, filed on Jul. 10, 2020, the contents of which are hereby incorporated by reference in their entirety.

BACKGROUND INFORMATION

Auto-exposure algorithms operate by analyzing image frames to determine how much light is present at a scene depicted by the image frames and by updating, based on this analysis, auto-exposure parameters of an image capture device capturing the image frames. In this manner, the auto-exposure parameters may be continually updated to cause the image capture device to provide a desired amount of exposure for image frames being captured. Without good auto-exposure management, detail may be lost during the image capture process by either over-exposure (e.g., where details are lost because of saturation and the image looks too bright) or under-exposure (e.g., where details are lost because of noise and the image looks too dark).

One challenge that auto-exposure algorithms attempt to address is that while different regions of a given image frame may appear darker or brighter than other regions (and may thereby call for different auto-exposure parameters), the auto-exposure parameters selected for an image capture device at any given time may influence how all the regions of a given image frame are captured. As such, while auto-exposure parameters may be tailored to serve one region or another, the auto-exposure parameters might not be tailored to serve every region equally well when brightness varies significantly from region to region of an image frame.

SUMMARY

The following description presents a simplified summary of one or more aspects of the apparatuses, systems, and methods described herein. This summary is not an extensive overview of all contemplated aspects and is intended to neither identify key or critical elements of all aspects nor delineate the scope of any or all aspects. Its sole purpose is to present one or more aspects of the systems and methods described herein as a prelude to the detailed description that is presented below.

An illustrative apparatus for gaze-based auto-exposure management of image frames may include one or more processors and memory storing executable instructions that, when executed by the one or more processors, cause the apparatus to perform various operations described herein. For example, the apparatus may determine auto-exposure values for pixel units into which an image frame is divided. The image frame may be included within an image frame sequence captured by an image capture system. The apparatus may also assign weight values to the pixel units based on a gaze direction of a viewer viewing the image frame sequence. Based on the auto-exposure values determined for the pixel units and the weight values assigned to the pixel units, the apparatus may update one or more auto-exposure parameters for use by the image capture system to capture an additional image frame within the image frame sequence.

An illustrative system for gaze-based auto-exposure management of image frames may include an illumination source, an image capture device, and one or more processors. The illumination source may be configured to illuminate tissue within a body during a performance of a medical procedure performed by a user. The image capture device may be configured to capture an image frame sequence during the performance of the medical procedure. The image frame sequence may include an image frame depicting an internal view of the body that features the tissue illuminated by the illumination source. The one or more processors may be configured to determine auto-exposure values and auto-exposure targets for pixel units into which the image frame is divided. The one or more processors may also assign weight values to the pixel units based on a gaze direction of the user as the user views the image frame sequence. Based on the auto-exposure values and the auto-exposure targets determined for the pixel units and the weight values assigned to the pixel units, the one or more processors may update one or more auto-exposure parameters for use by the image capture device or the illumination source to capture an additional image frame within the image frame sequence.

An illustrative non-transitory computer-readable medium may store instructions that, when executed, cause one or more processors of a computing device to perform various operations described herein. For example, the one or more processors may determine auto-exposure targets for pixel units into which an image frame is divided. The image frame may be included within an image frame sequence captured by an image capture system. The one or more processors may also assign weight values to the pixel units based on a gaze direction of a viewer viewing the image frame sequence. Based on the auto-exposure targets determined for the pixel units and the weight values assigned to the pixel units, the one or more processors may update one or more auto-exposure parameters for use by the image capture system to capture an additional image frame within the image frame sequence.

An illustrative method for gaze-based auto-exposure management of image frames may include various operations described herein, each of which may be performed by a computing device such as an auto-exposure management apparatus described herein. For example, the method may include determining auto-exposure values and auto-exposure targets for pixel units into which an image frame is divided. The image frame may be included within an image frame sequence captured by an image capture system. The method may further include assigning weight values to the pixel units based on a gaze direction of a viewer viewing the image frame sequence. The method may also include updating, based on the auto-exposure values and the auto-exposure targets determined for the pixel units and the weight values assigned to the pixel units, one or more auto-exposure parameters for use by the image capture system to capture an additional image frame within the image frame sequence.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 7A-7D show various aspects of how illustrative weight values may be assigned to pixel units of an illustrative image frame according to principles described herein.

DETAILED DESCRIPTION

Figure 1:
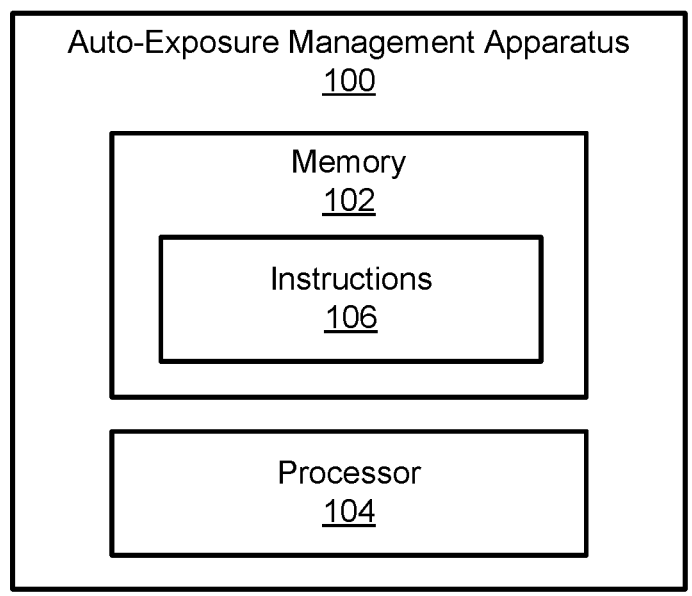
FIG. 1 shows an illustrative auto-exposure management apparatus for gaze-based auto-exposure management of image frames according to principles described herein.

Apparatuses, systems, and methods for gaze-based auto-exposure management of image frames are described herein. As mentioned above, certain regions of a given image frame may appear darker or brighter than other regions, thereby making auto-exposure parameters that are well-tailored for certain regions suboptimal for other regions (e.g., possibly leading to overexposure and/or underexposure in the other regions). However, because selected settings for the auto-exposure parameters of an image capture system may define how entire image frames are exposed and captured (e.g., rather than being able to define the exposure region by region), auto-exposure management may involve prioritization and/or compromise with respect to each different region as decisions are made for how each image frame is to be exposed.

For example, one way that an auto-exposure algorithm could be configured to implement compromise in this type of decision making is to expose an image frame in accordance with average auto-exposure properties for the entire image frame. If one region of the image frame is very bright and another region is very dark, for instance, such compromise may involve setting the auto-exposure parameters to cater to a brightness level between the very bright and very dark levels detected in the image frame. Such compromise may reduce the likelihood that any region of the image frame will be severely overexposed or underexposed, but, for the same reasons, the compromise may also reduce the likelihood that any given region that may be important for the viewer to see in detail will be exposed optimally (e.g., in a desirable manner to maximize the detail that the viewer can see in that region).

As another example, an auto-exposure algorithm could be configured to implement prioritization of one region over another in this type of decision making by exposing the image frame in accordance with the auto-exposure properties called for by one region at the expense of another region. If one region of the image frame is very bright and another region is very dark, for instance, such prioritization may involve setting the auto-exposure parameters to cater to either the bright region or the dark region at the expense of the other. Such prioritization may provide more desirable exposure for the prioritized region than a compromise would provide, and may thus be used if the prioritized region happens to be the region that the viewer cares more about at the moment. However, the prioritization technique may provide less desirable exposure for non-prioritized regions than the compromise technique provides, thus potentially being problematic if the region that the viewer cares more about at the moment is a non-prioritized region.

Apparatuses, systems, and methods for gaze-based auto-exposure management of image frames described herein address the potential shortcomings of the auto-exposure techniques described above by employing a gaze-based prioritization technique so that the region that auto-exposure management caters to is the region that the viewer may care more about at a given time. For example, auto-exposure management described herein may incorporate real-time gaze-tracking techniques for a viewer of an image frame sequence into auto-exposure management for the image capture system capturing the image frame sequence. In this way, auto-exposure management described herein may continually prioritize whichever region of each image frame may be more relevant to the viewer (e.g., the viewer's real-time area of focus), thereby consistently providing the viewer an attractive and detailed view of the subject matter of interest, reducing the viewer's eye strain, and otherwise improving the viewer's experience.

As one example of an application that benefits from gaze-based auto-exposure management described herein, an endoscopic image capture device capturing an internal view of a body during a medical procedure on the body (e.g., a surgical procedure, etc.) will be considered. In this situation, a viewer of the endoscopic imagery (e.g., a surgeon or other person assisting with the medical procedure) may desire to see detail of certain anatomy (e.g., tissue) present in the internal view and upon which the user may be working. However, other anatomical or non-anatomical content present at the scene and that is not the user's focus (e.g., blood and tissue apart from where the user is working, an instrument or other tool, etc.) may call for different auto-exposure parameters and may thus undesirably pull average auto-exposure properties up or down if accounted for to the same extent as the content in the user's area of focus. Accordingly, gaze-based auto-exposure management described herein may ensure that content outside of the user's real-time area of focus is not accounted for to the same extent as content that the user is actually looking at. In this way, non-relevant content may be less likely to undesirably pull the average luminance of the scene up or down, thereby mitigating or resolving issues described above related to undesired overexposure or underexposure of relevant content on which the user is focused. All of this may be done in a smooth manner to reduce brightness fluctuation issues that could be caused when the user's gaze shifts rapidly. In this way, the auto-exposure management also mitigates distraction to the user, eye fatigue induced in the user, and other such issues that brightness fluctuation issues could cause.

Medical procedure examples involving endoscopic views provided to users such as surgeons whose gaze may be tracked with respect to the endoscopic views presented will be referred to throughout this description to illustrate various aspects of the claimed subject matter. However, it will be understood that such endoscopic images are only intended as examples, and the principles described herein may be applied, in various implementations, to any suitable types of content as may serve a particular application or use case. As a few additional examples, for instance, auto-exposure management described herein may find application in photographic applications, augmented reality applications, or other applications in which an image frame sequence being captured is presented directly to a user's eye (e.g., with a head-mounted display device, with a device held in front of the user's face, etc.) in a manner that enables real-time gaze tracking of the user as the user views the captured imagery.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Gaze-based auto-exposure management apparatuses, systems, and methods described herein may provide any of the benefits mentioned above, as well as various additional and/or alternative benefits that will be described and/or made apparent below.

FIG. 1 shows an illustrative auto-exposure management apparatus 100 (apparatus 100) for gaze-based auto-exposure management of image frames according to principles described herein. Apparatus 100 may be implemented by computer resources (e.g., servers, processors, memory devices, storage devices, etc.) included within an image capture system (e.g., an endoscopic image capture system, etc.), by computer resources of a computing system associated with an image capture system (e.g., communicatively coupled to the image capture system), and/or by any other suitable computing resources as may serve a particular implementation.

As shown, apparatus 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within apparatus 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause apparatus 100 to perform any of the functionality described herein. Instructions 106 may be implemented by any suitable application, software, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), image signal processors, or the like. Using processor 104 (e.g., when processor 104 is directed to perform operations represented by instructions 106 stored in memory 102), apparatus 100 may perform various functions associated with gaze-based auto-exposure management of image frames.

Figure 2:
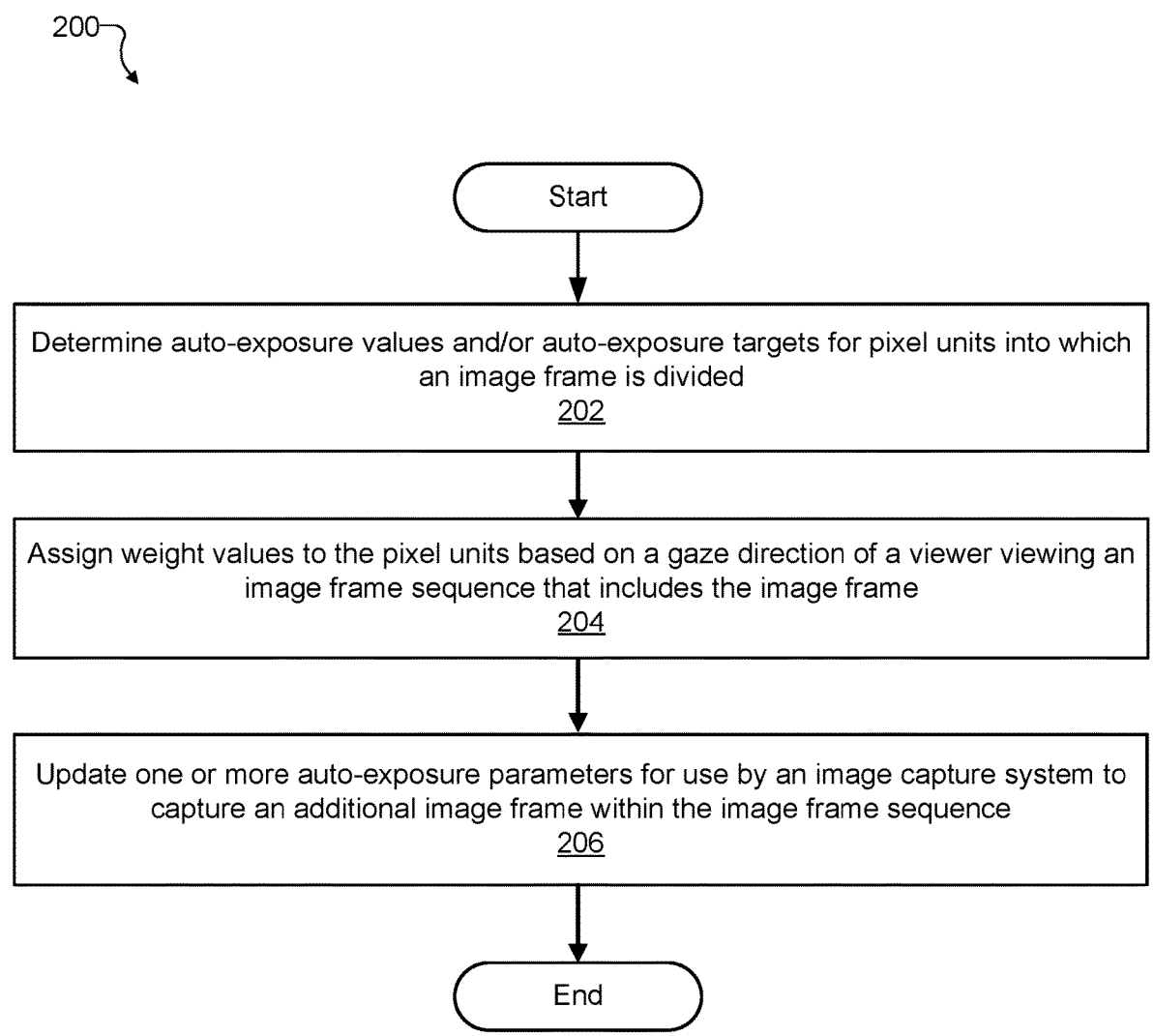
FIG. 2 shows an illustrative auto-exposure management method for gaze-based auto-exposure management of image frames according to principles described herein.

FIG. 2 shows an illustrative gaze-based auto-exposure management method 200 (method 200) that apparatus 100 may perform in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an auto-exposure management apparatus (e.g., apparatus 100), an auto-exposure management system (e.g., an implementation of an auto-exposure management system described below), and/or any implementation thereof.

At operation 202, apparatus 100 may determine respective auto-exposure data points for one or more pixel units (e.g., individual pixels or groups of pixels) into which an image frame is divided. For example, the image frame may be included within an image frame sequence captured by an image capture system. Auto-exposure data points that may be determined for each pixel unit into which the image frame is divided may include an auto-exposure value for each pixel unit, an auto-exposure target for each pixel unit, an auto-exposure gain for each pixel unit, and/or any other auto-exposure data point as may serve a particular implementation.

An auto-exposure value will be understood to represent certain auto-exposure-related characteristics (e.g., luminance, signal intensity, chrominance, etc.) of a particular image frame or portion thereof (e.g., region, pixel unit, etc.). For example, apparatus 100 may detect such characteristics by analyzing the image frame captured by the image capture system. A unit auto-exposure value may refer to a luminance determined for a particular pixel unit of a plurality of pixel units into which an image frame is divided. For example, if each pixel unit includes only an individual pixel, the unit auto-exposure value may be determined as a luminance of the individual pixel. Conversely, if each pixel unit includes a group of pixels, the unit auto-exposure value may be determined as an average luminance of the group of pixels. As will be described in more detail below, unit auto-exposure values for pixel units of an image frame may be accounted for in a determination of a frame auto-exposure value, which may refer to an average luminance of some or all of the pixel units included within an image frame. For example, a frame auto-exposure value may correspond to an image frame in an analogous way as a unit auto-exposure value corresponds to a particular pixel unit of an image frame.

In examples involving average luminance (or other average exposure related characteristics), it will be understood that the average luminance represented by an auto-exposure value may be determined as any type of average as may serve a particular implementation. For instance, an average auto-exposure value for a pixel unit may refer to a mean luminance of pixels in the pixel unit, determined by summing respective luminance values for each pixel of the pixel unit and then dividing the sum by the total number of pixels.

As another example, an average auto-exposure value for a pixel unit may refer to a median luminance of pixels in the pixel unit, determined as the central luminance value when the respective luminance values for each pixel are ordered by value. As yet another example, an average auto-exposure value for a pixel unit may refer to a mode luminance of pixels in the pixel unit, determined as whichever luminance value, of the respective luminance values for each pixel in the pixel unit, is most prevalent or repeated most often. In other examples, other types of averages (besides mean, median, or mode) and/or other types of exposure-related characteristics (besides luminance) may also be used to determine an average auto-exposure value in any manner as may serve a particular implementation.

An auto-exposure target will be understood to refer to a target (e.g., a goal, a desirable value, an ideal, an optimal value, etc.) for the auto-exposure value of a particular image frame or portion thereof (e.g., region, pixel unit, etc.). Apparatus 100 may determine auto-exposure targets based on the particular circumstances and any suitable criteria, and the auto-exposure targets may relate to the same auto-exposure-related characteristics (e.g., luminance, signal intensity, chrominance, etc.) as are represented by the auto-exposure values. For example, auto-exposure targets may be determined at desirable levels of luminance (or other exposure-related characteristics) such as a luminance level associated with middle gray or the like. As such, a unit auto-exposure target may refer to a desired target luminance determined for a pixel unit of a plurality of pixel units into which an image frame is divided. Similarly, a frame auto-exposure target may represent an average desired target luminance for some or all of the pixel units included within the image frame, and, as such, may represent an auto-exposure target that corresponds to the image frame in an analogous way as a unit auto-exposure target corresponds to a particular pixel unit. Similarly as described above in relation to how unit auto-exposure values may be determined, unit auto-exposure targets in such examples may be determined by averaging individual pixel auto-exposure targets using a mean, median, mode, or other suitable type of averaging technique.

At operation 204, apparatus 100 may assign weight values to the pixel units into which the image frame is divided. These weight values may be based on any of various factors that apparatus 100 may take into consideration in a particular implementation. For example, the weight values may be at least partially based on a gaze direction of a viewer viewing the image frame sequence. If the viewer is a surgeon performing a medical procedure, for instance, and the image frame sequence depicts an endoscopic view internal to a body receiving the medical procedure, an eye tracking system may determine the gaze direction by tracking the eyes of the surgeon as he or she looks at the presentation of the endoscopic view during the performance of the medical procedure. For pixel units of the image frame positioned in areas corresponding to the viewer's gaze direction, the weight values assigned by apparatus 100 may be relatively large so that these pixel units (which currently may be the pixel units likely to be depicting more relevant content to the viewer) may be prioritized over other (e.g., less relevant) pixel units as the auto-exposure management is performed. Conversely, for pixel units of the image frame positioned in areas relatively far away from the viewer's gaze direction, the weight values assigned by apparatus 100 may be relatively small so that these pixel units (which may be depicting content less relevant to the viewer) may be deprioritized to allow other more relevant pixel units to exert greater influence on the auto-exposure management.

At operation 206, apparatus 100 may update (e.g., adjust or maintain) one or more auto-exposure parameters for use by the image capture system to capture one or more additional image frames within the image frame sequence. In some examples, apparatus 100 may update the one or more auto-exposure parameters based on the auto-exposure data points (e.g., auto-exposure values, auto-exposure targets, auto-exposure gains, etc.) determined for the pixel units at operation 202. Additionally, apparatus 100 may update the one or more auto-exposure parameters further based on the weight values assigned to the pixel units at operation 204. For example, as will be described in more detail below, apparatus 100 may employ a weighted average of unit auto-exposure data points to determine frame auto-exposure data points corresponding to the image frame (e.g., a frame auto-exposure value, a frame auto-exposure target, a frame auto-exposure gain, etc.). By determining frame auto-exposure data points using techniques of weighted averaging, apparatus 100 may update the auto-exposure parameters of the image capture system in a manner that prioritizes the regions that are more relevant to the viewer in real time while deprioritizing other regions that may be less relevant to the viewer at a given moment in time.

In some examples, once apparatus 100 has determined a frame auto-exposure value and a frame auto-exposure target based on the unit auto-exposure data points and weight values (and using weighted average techniques), apparatus 100 may update the one or more auto-exposure parameters of the image capture system at operation 206 based on the frame auto-exposure value and/or frame auto-exposure target. For example, apparatus 100 may determine an auto-exposure gain for the image frame (a frame auto-exposure gain) based on the frame auto-exposure value and frame auto-exposure target, and may perform the updating of the one or more auto-exposure parameters based on the frame auto-exposure gain.

Apparatus 100 may update the auto-exposure parameters at operation 206 by either adjusting the parameters or maintaining the parameters as appropriate based on the auto-exposure gain. In this way, the image capture system may capture one or more additional image frames (e.g., subsequent image frames in an image frame sequence being captured) using auto-exposure parameters (e.g., exposure time parameters, shutter aperture parameters, illumination intensity parameters, image signal analog and/or digital gains, etc.) that may reduce the difference between auto-exposure values detected for those additional image frames and auto-exposure targets desirable for those additional image frames. Accordingly, the additional image frames may be captured with more desirable exposure characteristics than might be captured without such adjustments, and users of apparatus 100 may experience a superior and real-time customized image (e.g., an image that shows details of the more relevant content at a desired brightness level, etc.).

Apparatus 100 may be implemented by one or more computing devices or by computing resources of a general purpose or special purpose computing system such as will be described in more detail below. In certain embodiments, the one or more computing devices or computing resources implementing apparatus 100 may be communicatively coupled with other components such as an image capture system used to capture the image frames that apparatus 100 is configured to process. In other embodiments, apparatus 100 may be included within (e.g., implemented as a part of)

an auto-exposure management system. Such an auto-exposure management system may be configured to perform all the same functions described herein to be performed by apparatus 100 (e.g., including the operations of method 200, described above), but may further incorporate additional components such as the image capture system so as to also be able to perform the functionality associated with these additional components.

Figure 3:
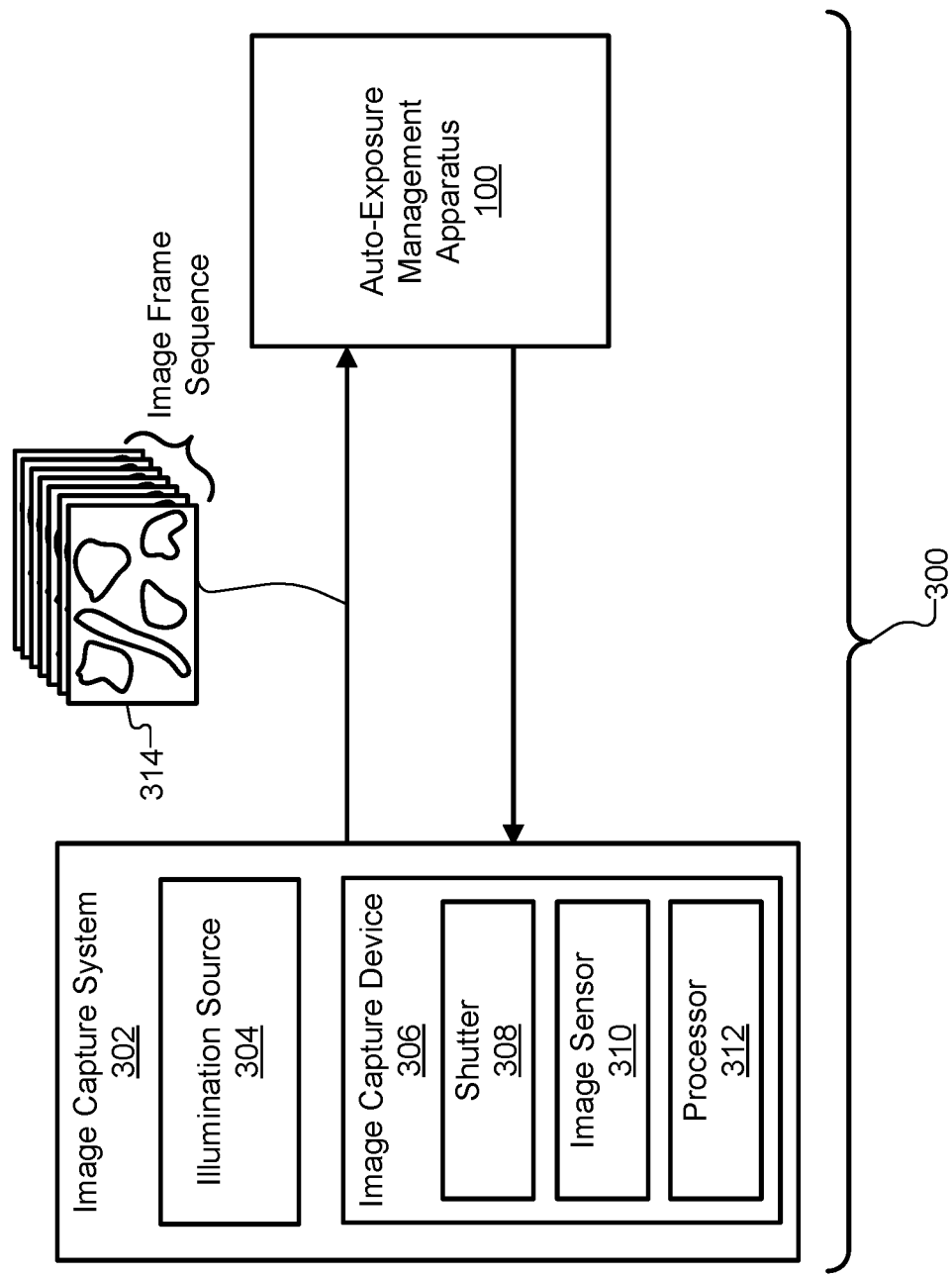
FIG. 3 shows an illustrative auto-exposure management system for gaze-based auto-exposure management of image frames according to principles described herein.

FIG. 3 shows an illustrative auto-exposure management system 300 (system 300) for gaze-based auto-exposure management of image frames. As shown, system 300 may include an implementation of apparatus 100 together with an image capture system 302 that includes an illumination source 304 and an image capture device 306 that incorporates a shutter 308, an image sensor 310, and a processor 312 (e.g., one or more image signal processors implementing an image signal processing pipeline). Within system 300, apparatus 100 and image capture system 302 may be communicatively coupled to allow apparatus 100 to direct image capture system 302 in accordance with operations described herein, as well as to allow image capture system 302 to capture and provide to apparatus 100 an image frame sequence 314 and/or other suitable captured image data. Each component of image capture system 302 will now be described.

Illumination source 304 may be implemented to source any type of illumination (e.g., visible light, infrared or near-infrared light, fluorescence excitation light, etc.) and may be configured to interoperate with image capture device 306 within image capture system 302. For example, illumination source 304 may provide a certain amount of illumination to a scene to facilitate image capture device 306 in capturing optimally illuminated images of the scene.

Image capture device 306 may be implemented by any suitable camera or other device configured to capture images of a scene. For instance, in a medical procedure example, image capture device 306 may be implemented by an endoscopic image capture device configured to capture image frame sequence 314, which may include an image frame depicting a view (e.g., an internal view) of the body undergoing the medical procedure. As shown, image capture device 306 may include components such as shutter 308, image sensor 310, and processor 312.

Image sensor 310 may be implemented by any suitable image sensor, such as a charge coupled device (CCD) image sensor, a complementary metal-oxide semiconductor (CMOS) image sensor, or the like.

Shutter 308 may interoperate with image sensor 310 to assist with the capture and detection of light from the scene. For example, shutter 308 may be configured to expose image sensor 310 to a certain amount of light for each image frame captured. Shutter 308 may comprise an electronic shutter and/or a mechanical shutter. Shutter 308 may control how much light image sensor 310 is exposed to by opening to a certain aperture size defined by a shutter aperture parameter and/or for a specified amount of time defined by an exposure time parameter. As will be described in more detail below, these shutter-related parameters may be included among the auto-exposure parameters that apparatus 100 is configured to update.

Processor 312 may be implemented by one or more image signal processors configured to implement at least part of an image signal processing pipeline. Processor 312 may process auto-exposure statistics input (e.g., by tapping the signal in the middle of the pipeline to detect and process various auto-exposure data points and/or other statistics), perform optics artifact correction for data captured by image sensor 310 (e.g., by reducing fixed pattern noise, correcting defective pixels, correcting lens shading issues, etc.), perform signal reconstruction operations (e.g., white balance operations, demosaic and color correction operations, etc.), apply image signal analog and/or digital gains, and/or perform any other functions as may serve a particular implementation. Various auto-exposure parameters may dictate how the functionality of processor 312 is to be performed. For example, auto-exposure parameters may be set to define the analog and/or digital gains processor 312 applies, as will be described in more detail below.

In some examples, an endoscopic implementation of image capture device 306 may include a stereoscopic endoscope that includes two full sets of image capture components (e.g., two shutters 308, two image sensors 310, etc.) to accommodate stereoscopic differences presented to the two eyes (e.g., left eye and right eye) of a viewer of the captured image frames. Conversely, in other examples, an endoscopic implementation of image capture device 306 may include a monoscopic endoscope with a single shutter 308, a single image sensor 310, and so forth.

Apparatus 100 may be configured to control various auto-exposure parameters of image capture system 302 and may adjust such auto-exposure parameters in real time based on incoming image data captured by image capture system 302 and eye tracking data received from an eye tracking system associated with apparatus 100. As mentioned above, certain auto-exposure parameters of image capture system 302 may be associated with shutter 308 and/or image sensor 310. For example, apparatus 100 may direct shutter 308 in accordance with an exposure time parameter corresponding to how long the shutter is to allow image sensor 310 to be exposed to the scene, a shutter aperture parameter corresponding to an aperture size of shutter 308, or any other suitable auto-exposure parameters associated with shutter 308. Other auto-exposure parameters may be associated with aspects of image capture system 302 or the image capture process unrelated to shutter 308 and/or sensor 310. For example, apparatus 100 may adjust an illumination intensity parameter of illumination source 304 that corresponds to an intensity of illumination provided by illumination source 304, an illumination duration parameter corresponding to a time period during which illumination is provided by illumination source 304, or the like. As yet another example, apparatus 100 may adjust gain parameters corresponding to one or more analog and/or digital gains (e.g., analog gains, bayer gains, RGB gains, etc.) applied by processor 312 to image data (e.g., luminance data) generated by image sensor 310.

Any of these or other suitable parameters, or any combination thereof, may be updated and/or otherwise adjusted by apparatus 100 for subsequent image frames based on an analysis of the current image frame. For instance, in one example where the frame auto-exposure gain (e.g., calculated as the frame auto-exposure target divided by the frame auto-exposure value) is determined to be 6.0, various auto-exposure parameters could be set as follows: 1) a current illumination intensity parameter may be set to 100% (e.g., maximum output); 2) an exposure time parameter may be set to 1/60th of a second (e.g., 60 fps); 3) an analog gain may be set to 5.0 (with a cap of 10.0); 4) a bayer gain may be set to 1.0 (with a cap of 3.0); and 5) an RGB gain may be set to 2.0 (with a cap of 2.0). With these settings, the gain is distributed across the analog gain (10.0/5.0=2.0), bayer gain (3.0/1.0=3.0), and RGB gain (2.0/2.0=1.0) to establish the desired 6.0 total auto-exposure gain (3.0*2.0*1.0=6.0) for the frame.

As has been mentioned, while principles described herein may be applied to a wide variety of image capture scenarios, many examples explicitly described herein relate to medical procedures that may be performed using a computer-assisted medical system such as will be described in more detail below in relation to FIG. 11. In such examples, the scene for which images are being captured may include an internal view of a body on which the medical procedure is being performed (e.g., a body of a live animal, a human or animal cadaver, a portion of human or animal anatomy, tissue removed from human or animal anatomies, non-tissue work pieces, training models, etc.). As such, system 300 or certain components thereof (e.g., image capture system 302) may be integrated with (e.g., implemented by imaging and computing resources of) a computer-assisted medical system. The eye tracking system may also be integrated with the computer-assisted medical system. In these examples, a user of the computer-assisted medical system (e.g., a surgeon or other surgical team member who is assisting in the performance of the medical procedure) may be the viewer whose eye movements are tracked to determine the gaze direction serving as one of the bases upon which the weighted values are assigned to each pixel unit. As such, while not explicitly shown in FIG. 3, it will be understood than an eye tracking system may be integrated with (e.g., included as another component within) system 300, or, in implementations in which the eye tracking system is implemented externally to system 300, the eye tracking system may be communicatively coupled to system 300.

Figure 4A:
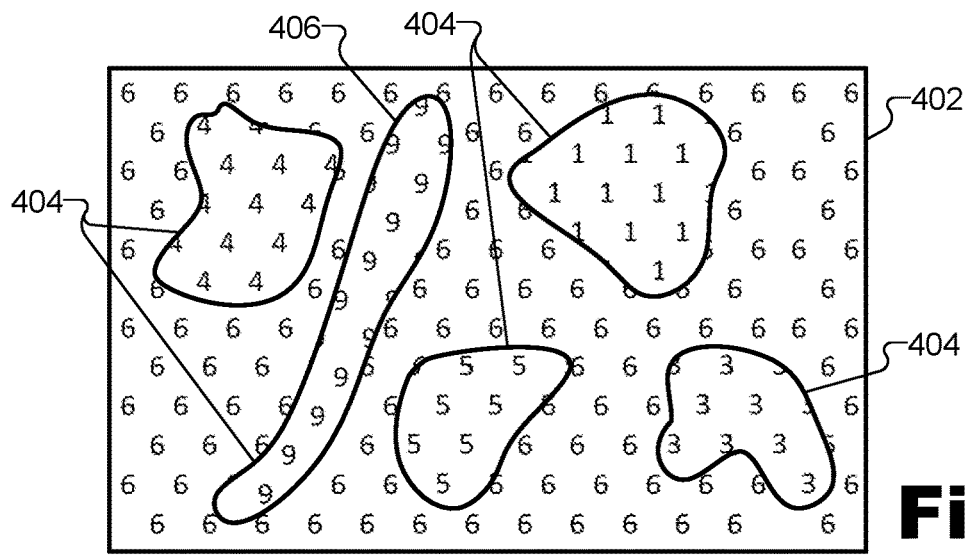
FIGS. 4A-4C show various aspects of an illustrative image frame that depicts a plurality of objects and that is divided into pixel units according to principles described herein.
Figure 4B:
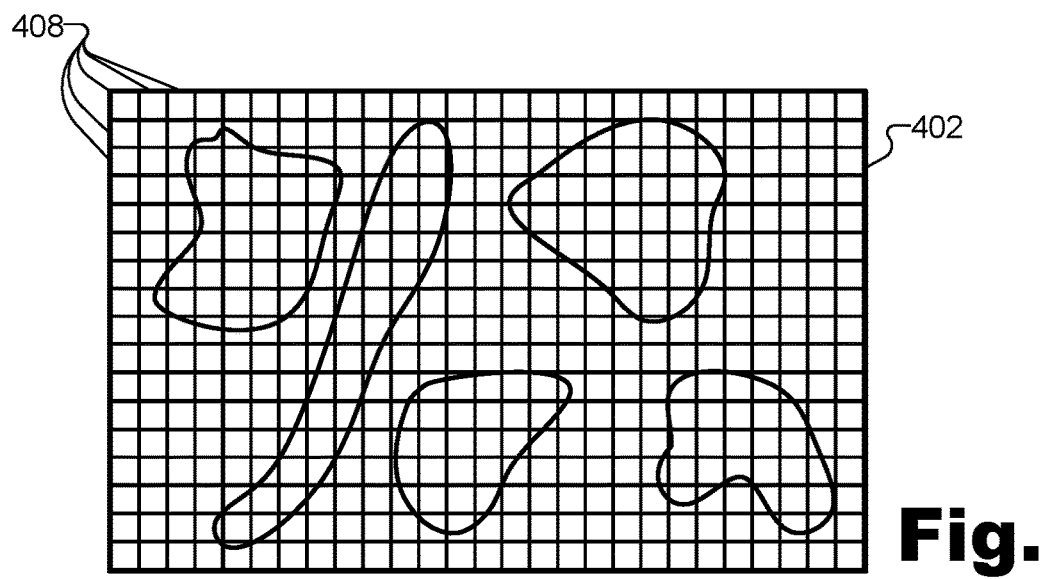
Figure 4C:
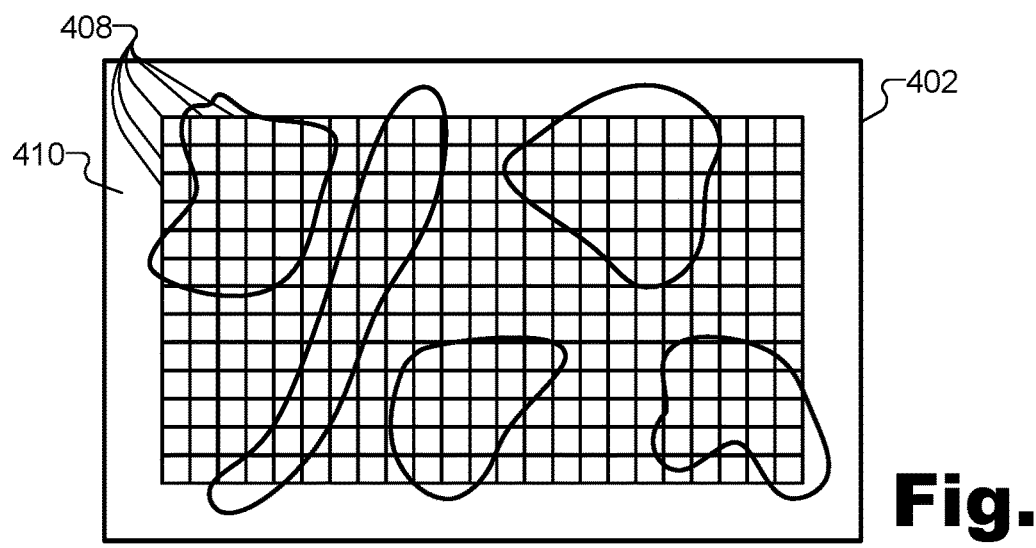

FIGS. 4A-4C show various aspects of an illustrative image frame 402 that depicts a plurality of objects 404 and that is divided into pixel units according to principles described herein. For example, image frame 402 may represent an image frame that is captured by system 300 and is included as one of the image frames of image frame sequence 314. Image frame 402 is shown to depict, in front of a background, various objects 404. For example, if image frame 402 is included in an endoscopic image frame sequence depicting a scene within a body at a site where a medical procedure is being performed, objects 404 may represent anatomical objects (e.g., tissue, bone, organs or portions thereof, etc.) or non-anatomical objects (e.g., instruments, tools, and supplies being used to perform the medical procedure, etc.) present at the scene and featured on an anatomical background (e.g., a background of blood, tissue, etc.).

As a viewer (e.g., a user assisting in performing the medical procedure) views the image frame sequence that includes image frame 402, certain objects 404 may be of interest to the viewer (e.g., a focus of the viewer's gaze) at one point in time while other objects 404 may be of interest to the viewer at another point in time. Additionally, a particular object 404 that is of continual interest to the viewer may be positioned at one location within image frame 402 and may be positioned at a different location within another image frame captured at a different time (e.g., a later image frame in the same image frame sequence) due to movement of the object 404, movement of the image capture device vantage point (e.g., due to a change in the pose of the endoscope), or the like. As will be described in more detail below, one or more of objects 404 (e.g., including an object labeled as object 406 for the example described below) may rarely or never be of interest to the viewer. For example, one or more instrument shafts of instruments being employed to perform a medical procedure may commonly be present at the scene of the medical procedure, yet these instrument shafts might not be the focus of the viewer's attention (e.g., something that the viewer desires to be able to see in detail even at the expense of other objects).

FIG. 4A shows illustrative auto-exposure data that may be associated with different imagery captured within image frame 402. While FIG. 4A is depicted as a black and white drawing, various digits 1-9 used to fill the various objects 404 and the background areas depicted in image frame 402 will be understood to represent different auto-exposure values, auto-exposure targets, or other auto-exposure data points associated with the different parts of the image frame. In this digit-based auto-exposure data point notation, digits closer to one another (e.g., 1 and 2, 8 and 9, etc.) will be understood to represent similar auto-exposure data points (e.g., similar auto-exposure values, similar auto-exposure targets, etc.), while digits farther away from one another (e.g., 1 and 8, 2 and 9, etc.) will be understood to represent more distinct auto-exposure data points. In some examples, this digit-based notation may be interpreted to wrap around such that digit 1 is considered to be adjacent to digit 9 and auto-exposure data represented by digit 1 is similar to auto-exposure data represented by digit 9.

It will be understood that the digits shown in FIG. 4A are not intended to be indicative of any particular auto-exposure value or auto-exposure target, but, rather, are intended to illustrate the principle that auto-exposure data points corresponding to different regions of image frame 402 (e.g., different pixels and pixel units associated with different objects and regions) may vary. Interpreted in a different way, the digit notation shown in FIG. 4A could also be understood to illustrate the variance of other properties and characteristics of the different regions of the image frame. For example, different digits in FIG. 4A could be interpreted to represent different chrominance characteristics (e.g., color properties), luminance characteristics (e.g., brightness properties), and/or other properties associated with the imagery depicted in image frame 402.

FIGS. 4B and 4C show different illustrative layouts of a plurality of pixel units 408 into which image frame 402 is divided in order to perform pixel-unit-based processing described herein. As shown in both of these examples, pixel units 408 may be uniformly distributed in rows and columns to form a grid that covers some or all of the imagery captured in image frame 402 (e.g., as illustrated by the grid of pixel units being laid out over objects 404 and the background described above in relation to FIG. 4A). However, whereas in FIG. 4B the grid of pixel units 408 is shown to cover the entirety of image frame 402, in FIG. 4C the grid of pixel units 408 is shown to cover a particular region of interest of image frame 402 (e.g., a central region of interest that is less than an entirety of image frame 402). Consequently, as shown, a peripheral margin 410 around the grid of pixel units 408 is illustrated in FIG. 4C. For purposes of the pixel-unit-based processing described herein, margin 410 may be ignored, treated as a single large pixel unit with a greater or smaller weight than the other pixel units 408, or otherwise handled in any manner as may serve a particular implementation.

In some examples, each pixel unit 408 into which image frame 402 is divided may include a grouping of adjacent pixels. Averaging of neighboring pixels may make pixel-unit-based processing described herein more efficient and accurate since unrepresentative outlier characteristics (e.g., noise, etc.) affecting an individual pixel or small handful of pixels may be effectively filtered when averaged with a larger number of neighboring pixels within the same pixel unit 408. In other examples, each pixel unit 408 into which image frame 402 is divided may include only an individual pixel. By processing single-pixel pixel units such as these, apparatus 100 may bypass the advantages of the effective filtering provided by multi-pixel pixel units while potentially gaining other benefits related to extremely granular processing of each and every pixel for its own characteristics, which benefits may also be desirable in certain implementations.

Figure 5:
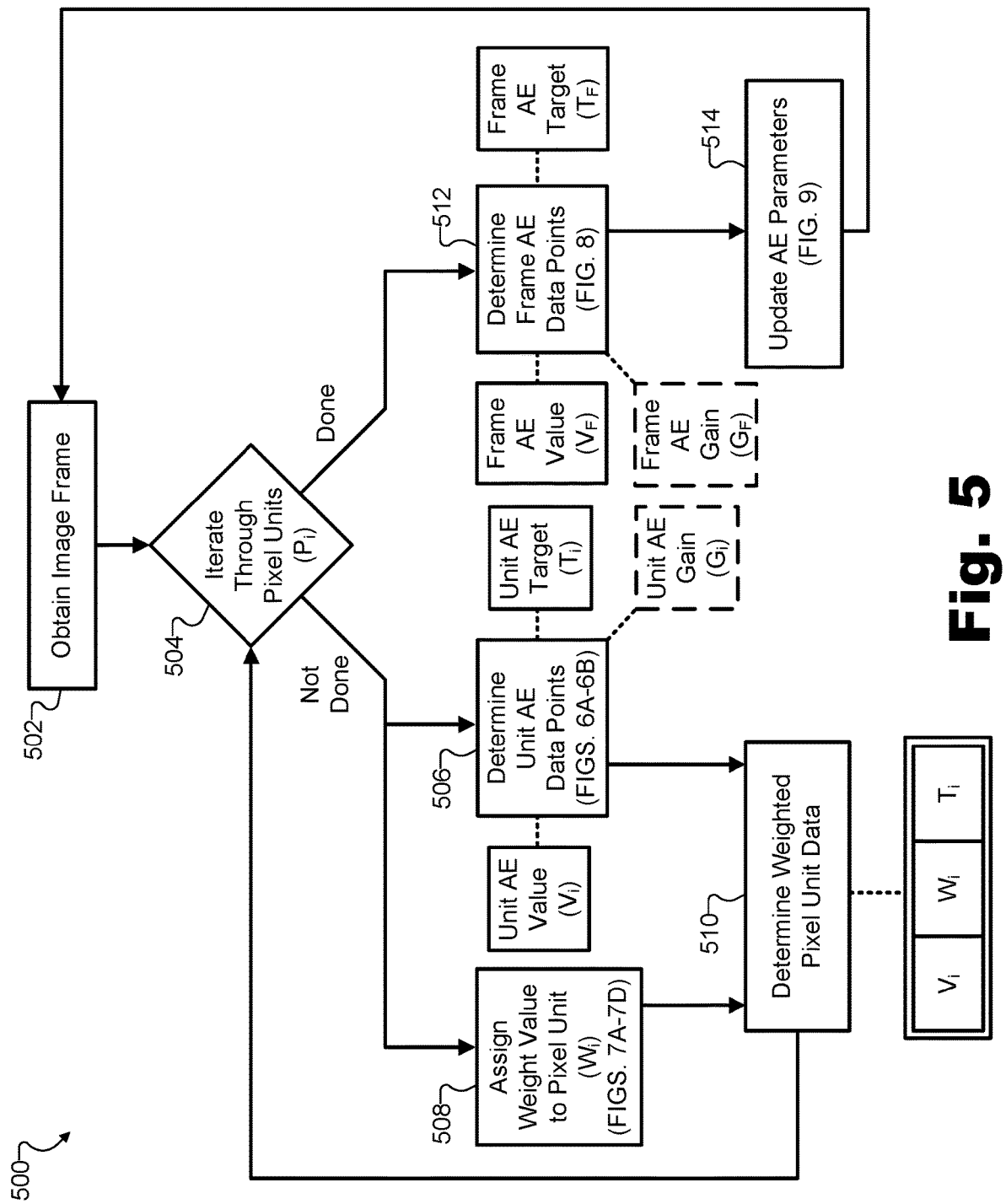
FIG. 5 shows an illustrative flow diagram for gaze-based auto-exposure management of image frames according to principles described herein.

FIG. 5 shows an illustrative flow diagram 500 for gaze-based auto-exposure management of image frames using, for example, an implementation of apparatus 100, method 200, and/or system 300. As shown, flow diagram 500 illustrates various operations 502-514, which will each be described in more detail below. It will be understood that operations 502-514 represent one embodiment, and that other embodiments may omit, add to, reorder, and/or modify any of these operations. As will be described, various operations 502-514 of flow diagram 500 may be performed for one image frame or multiple image frames (e.g., each image frame) in an image frame sequence. It will be understood that, depending on various conditions, not every operation might be performed for every frame, and the combination and/or order of operations performed from frame to frame in the image frame sequence may vary.

At operation 502, an image frame captured by an image capture system may be obtained (e.g., accessed, loaded, captured, generated, etc.). As previously explained, in certain examples, the image frame may be an image frame depicting different regions (e.g., regions corresponding to different objects, etc.) that may be the focus of a viewer at different times. For example, the obtained image frame may be similar to image frame 402 described above and may depict imagery such as objects 404 and the background shown in FIGS. 4A-4C. Operation 502 may be performed in any suitable way, such as by accessing the image frame from an image capture system (e.g., in the case that operation 502 is being performed by an implementation of apparatus 100 that is communicatively coupled to an image capture system) or by using an integrated image capture system to capture the image frame (e.g., in the case that operation 502 is being performed by an implementation of system 300 that includes integrated image capture system 302).

At operation 504, apparatus 100 may iterate through each pixel unit of an image frame or portion thereof (e.g., each pixel unit 408 of a grid that covers the entire image frame, such as illustrated in FIG. 4B, or each pixel unit 408 of a grid that is limited to a region of interest (e.g., a fixed region of interest) of the image frame less than the entire image frame, such as illustrated in FIG. 4C). Apparatus 100 may process each pixel unit $P_i$ at operations 506-510. For example, as shown, apparatus 100 may process pixel units $P_i$ at operation 506-510 as long as there are still pixel units of the image frame (or portion of the image frame) that have not yet been processed (Not Done). Then, when the pixel units of the image frame (or portion of the image frame) have been iterated through at operation 504 (Done), apparatus 100 may perform operations 512-514 before returning to operation 502 to obtain a subsequent image frame and to continue operating in this same manner.

At operation 506, apparatus 100 may determine one or more unit auto-exposure data points for the respective pixel unit $P_i$ that is being processed. For example, as shown, a respective unit auto-exposure value $V_i$ and/or a unit auto-exposure target $T_i$ for each respective pixel unit $P_i$ may be determined at operation 506 as the pixel units are processed in sequence (see operation 504).

Figure 6A:
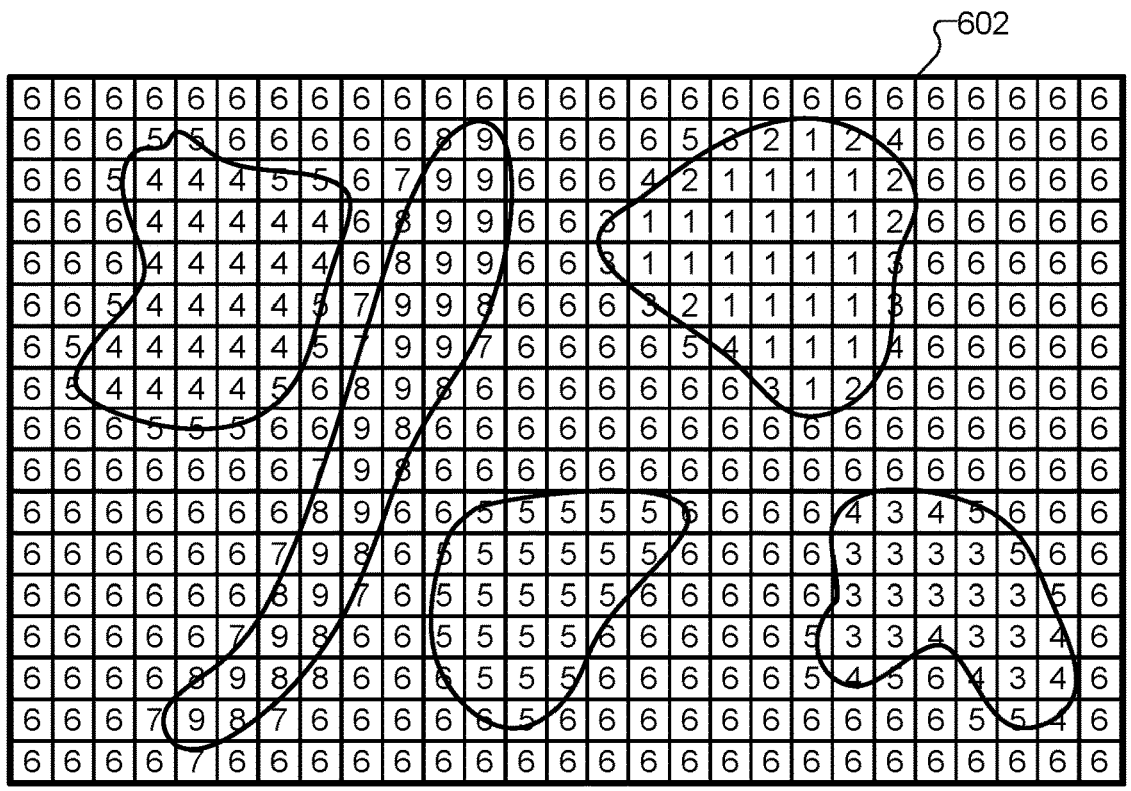
FIGS. 6A-6B show illustrative unit auto-exposure data points determined for an illustrative image frame according to principles described herein.
Figure 6B:
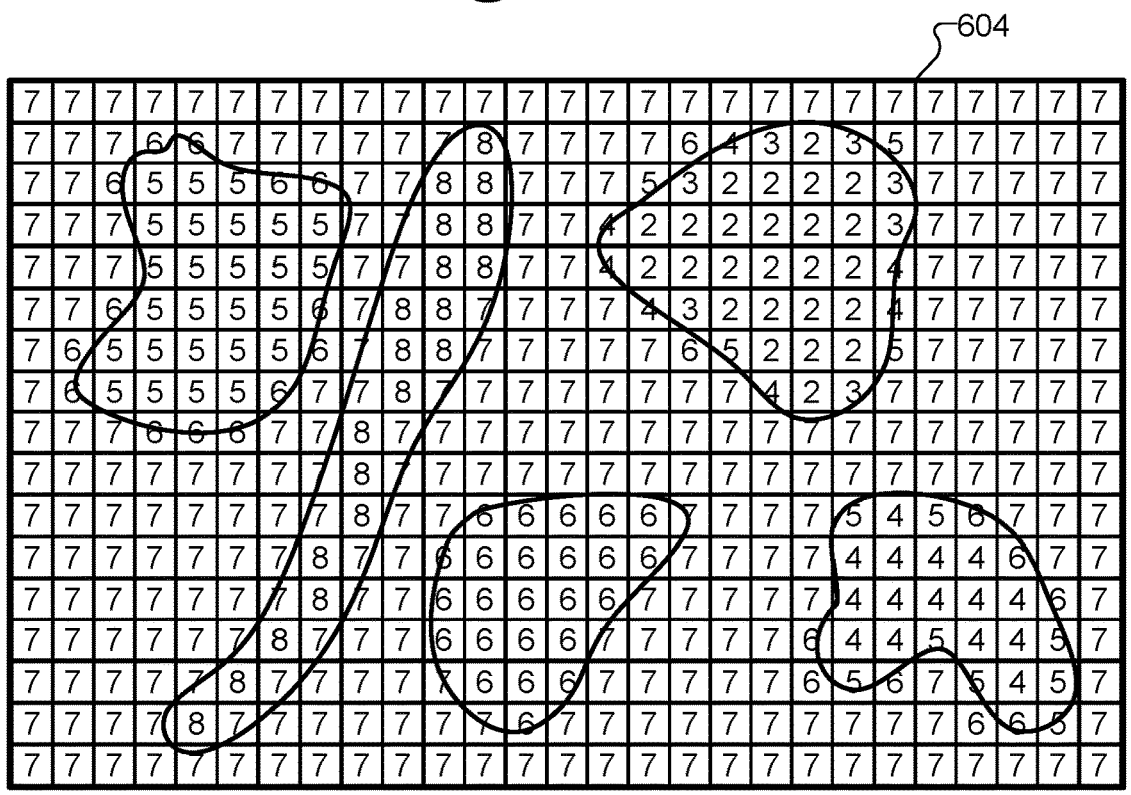

To illustrate, FIGS. 6A-6B show illustrative unit auto-exposure data points determined for an illustrative image frame such as image frame 402 described above. Specifically, FIGS. 6A-6B illustrate an example in which the auto-exposure data illustrated above in FIG. 4A is used to represent auto-exposure values of the different objects and regions of image frame 402, and in which different auto-exposure data is used to represent auto-exposure targets of these objects and regions.

In this example, as shown, a unit auto-exposure value map 602 illustrated in FIG. 6A represents the unit auto-exposure values for each pixel unit 408 of image frame 402, while a unit auto-exposure target map 604 illustrated in FIG. 6B represents the unit auto-exposure targets for each pixel unit 408 of image frame 402. It will be understood that each unit auto-exposure value and unit auto-exposure target shown in FIGS. 6A-6B are determined one pixel unit at a time as apparatus 100 iterates through the pixel units at operation 504, such that the entirety of maps 602 and 604 may be complete after the pixel units have been iterated through (e.g., after operation 506 has been performed many times to process each pixel unit $P_i$).

Referring to the auto-exposure values illustrated in FIG. 6A, it can be seen that respective unit auto-exposure values for each pixel unit 408 generally align with the auto-exposure data shown in FIG. 4A above (e.g., pixel units entirely within the background are shown to have respective unit auto-exposure values of digit '6', pixel units entirely within different objects 404 are shown to have respective unit auto-exposure values of the same digit used for the different objects in FIG. 4A, etc.). However, for pixel units 408 that lie on boundaries of regions having different auto-exposure values (e.g., pixel units on the boundaries of an object 404 and the background), FIG. 6A shows that other auto-exposure values may be determined such as auto-exposure values between the auto-exposure value of the object 404 itself and the auto-exposure value of the background.

Referring to the auto-exposure targets illustrated in FIG. 6B, it can be seen that respective unit auto-exposure targets for each pixel unit may be at least a little different from the auto-exposure data shown in FIG. 4A above. This indicates that, while the exposure of the current image frame 402 may be good, it may be appropriate to make adjustments to auto-exposure parameters before capturing subsequent image frames so that auto-exposure values for at least some regions of the image frame may align more ideally with their respective auto-exposure targets. As with the unit auto-exposure values shown in FIG. 6A, the unit auto-exposure targets shown in FIG. 6B are shown to be generally consistent across each object 404 (e.g., having unit auto-exposure targets of digits '5', '8', '6', '2', and '4' for different objects 404) and across the background (e.g., having unit auto-exposure targets of digit '7'). However, also similar to the values of FIG. 6A, the respective unit auto-exposure targets for pixel units 408 that lie on boundaries of objects 404 are shown in FIG. 6B to have been determined to have other auto-exposure targets (e.g., auto-exposure targets between the auto-exposure targets of the object 404 and the background).

While FIG. 6A will be understood to represent respective unit auto-exposure values $V_i$ and FIG. 6B will be understood to represent respective unit auto-exposure targets $T_i$, it will be understood that, in certain implementations, these values and targets may be combined at this stage to generate unit auto-exposure gains $G_i$ for each respective pixel unit. For example, a unit auto-exposure gain for a particular pixel unit may be calculated as a ratio of a unit auto-exposure target for the particular pixel unit and a unit auto-exposure value for the particular pixel unit. Returning to FIG. 5, pixel unit gains are illustrated as an additional or alternative output of operation 506. An implementation that employs such unit auto-exposure gains (e.g., in place of unit auto-exposure values and targets) will be described in more detail below.

At operation 508, each of the pixel units into which the image frame is divided may be assigned a respective weight value ($W_i$) based on any suitable weighting factors (such as will be described below). Respective weight values assigned at operation 508 may be indicative of an extent to which each pixel unit $P_i$ is to be accounted for in the auto-exposure management of the image frame as a whole. For example, if a relatively small weight value is assigned to a particular pixel unit at operation 508, that particular pixel unit may ultimately have relatively little influence on the overall auto-exposure management of the image frame (e.g., the particular pixel unit may largely be ignored for purposes of auto-exposure management of this frame). Conversely, if a relatively large weight value is assigned to a particular pixel unit at operation 508, that particular pixel unit may ultimately have a relatively significant influence on the overall auto-exposure management of the image frame. As shown in FIG. 5, operation 508 may be performed for each pixel unit $P_i$ (e.g., as long as the iterating of operation 504 is determined to be Not Done). Additionally, operation 508 is shown to be independent from operation 506 so that neither operation leads to the other in a manner that could imply a dependency between the two. As such, it will be understood that operation 508 may be performed prior to, subsequent to, or concurrently with operation 506.

FIGS. 7A-7D show various aspects of how illustrative weight values may be assigned at operation 508 to pixel units of an illustrative image frame (e.g., pixel unit 408 of image frame 402). More particularly, FIG. 7A shows a diagram 700 that indicates how certain aspects of image frame 402 relate to different illustrative weight maps 702 depicted in FIGS. 7B-7D (e.g., a weight map 702-1 shown in FIG. 7B, a weight map 702-2 shown in FIG. 7C, and a weight map 702-3 shown in FIG. 7D).

Diagram 700 depicted in FIG. 7A will be understood to represent image frame 402 that was described and illustrated above in relation to FIGS. 4A-4C. For example, it will be understood that the same objects 404 in the same positions described and illustrated above are present in the example image frame for which weight values are being determined here. Various components shown in diagram 700 and each of weight maps 702 will now be described in relation to FIG. 7A. In order to reduce clutter, these components are drawn but not explicitly labeled in FIGS. 7B-7D.

An icon 704 (e.g., a diamond icon) is illustrated at a center of diagram 700 and may be understood to represent a central position of the image frame being processed. For example, icon 704 may be placed at one or both of the vertical and horizontal center of the image to indicate a static position that has been determined to be a common area of interest or focus for viewers.

An icon 706 (e.g., another diamond icon) is illustrated apart from the center of diagram 700 (e.g., above and slightly to the left of icon 704). Icon 706 will be understood to represent a real-time gaze direction of the viewer (e.g., a position where a viewer of the image frame sequence is detected to be focused while image frame 402 is being processed). Icon 706 may be dynamically placed at any position indicated by an eye tracking system such as any eye tracking system described herein. As such, icon 706 may represent a dynamic position on which the viewer is actually focused, as opposed to, for example, representing a static position where the viewer may be statistically likely to be focused. As shown by the discrepancy between the positions of icons 704 and 706, the viewer is not, at the particular moment in time represented in this example, actually focusing his or her attention at the center of the image as certain auto-exposure algorithms might be configured to assume. Accordingly, as will be made apparent in the description below, auto-exposure management that accounts for the gaze direction represented by icon 706 may be superior in various ways to auto-exposure management that does not account for the gaze direction.

An object region 708 (e.g., a rectangular region in this example) is also illustrated in diagram 700 of FIG. 7A. As mentioned above, one or more of objects 404 may be known to be unlikely to be the focus of a viewer's attention for certain use cases. For example, in a use case such as an endoscopic medical procedure, the object 404 that is labeled as object 406 in FIG. 4A may represent an object (or portion of an object) such as an instrument shaft or other extraneous object that may be generally desirable for the auto-exposure management to discount. Object region 708 may represent the region depicting such an extraneous object (e.g., object 406 illustrated in FIG. 4A) and, as will be described in more detail below, may be treated differently from other regions in certain implementations in order to reduce the weight of pixel units depicting the object even if these pixel units might be spatially positioned in areas that would otherwise be assigned greater weights.

As shown in FIGS. 7B-7D, each pixel unit 408 of the grid of pixel units (e.g., the grid that is distributed across the entire image frame as in FIG. 4B rather than across only the central region as in FIG. 4C) is represented by a small box in weight maps 702. Each of these boxes is shown to include a single digit that represents the respective weight value assigned by apparatus 100 to the pixel unit associated with that box. It will be understood that this digit-based notation is used for convenience of illustration and that other weighting systems that employ percentages (e.g., between 0%-100%), integers within a certain range, discrete weight values (e.g., small weight, medium weight, and large weight, etc.), and/or any other suitable weight values may be used in various implementations. In the digit-based notation of FIGS. 7B-7D, it will be understood that larger digits represent greater weights while smaller digits represent smaller weights.

FIG. 7B shows weight map 702-1, which represents an example of a weight map in which the assigning of the weight values to the pixel units at operation 508 is performed based on the gaze direction of the viewer (e.g., based on a proximity to icon 706). For example, the gaze direction may be a real-time gaze direction that is continuously updated as the viewer views the image frame sequence in real time. As another example, the gaze direction may be an average gaze direction that is periodically or continuously updated to reflect an average direction that the viewer has viewed over a particular period of time (e.g., within the last 10 seconds, within the last minute, etc.). As shown by weight map 702-1, apparatus 100, in this example, may assign the largest weight value (e.g., digit '9') to the pixel units in the immediate vicinity of the gaze direction (e.g., in the area of icon 706), while assigning progressively smaller weight values (e.g., digit '8', digit '7', etc.) as the spatial distance between the pixel units and the gaze direction represented by icon 706 gets larger. As such, weight map 702-1 shows that pixel units near the periphery of the image frame far away from icon 706 may be assigned very small weight values (e.g., digits '1', '2', etc.) so that these pixel units might not be heavily accounted for in the auto-exposure management of the image frame.

FIG. 7C shows weight map 702-2, which represents an example of a weight map in which the assigning of the weight values to the pixel units at operation 508 is performed based on both: 1) the gaze direction of the viewer as the viewer views the image frame sequence in real time (e.g., a proximity to icon 706), and 2) a centrality of a respective position of each of the pixel units within the image frame (e.g., a proximity to icon 704). As shown by weight map 702-2, apparatus 100, in this example, may assign the largest weight value (e.g., digit '9') to the pixel units in either the immediate vicinity of the gaze direction (e.g., in the area of icon 706) or the immediate center of the image frame (e.g., in the area of icon 704), while assigning progressively smaller weight values (e.g., digit '8', digit '7', etc.) as the spatial distance between the pixel units and both the gaze direction represented by icon 706 and the center of the image frame represented by icon 704 gets larger. As with weight map 702-1, weight map 702-2 shows that a result of this manner of assigning weights is that pixel units near the periphery of the image frame far away from both icons 704 and 706 may be assigned very small weight values (e.g., digits '1', '2', etc.) so that these pixel units might not be heavily accounted for in the auto-exposure management of the image frame.

FIG. 7D shows weight map 702-3, which represents an example of a weight map in which the assigning of the weight values to the pixel units at operation 508 is performed based on both: 1) the gaze direction of the viewer as the viewer views the image frame sequence in real time (e.g., a proximity to icon 706), and 2) a position of an object with respect to environmental imagery of a scene depicted by the image frame (e.g., imagery of the scene other than imagery depicting the object) as the position of the object is tracked by an object tracking system (e.g., whether the pixel units are at least partially included within object region 708). More specifically, as with weight map 702-1 above, apparatus 100 may assign the largest weight value (e.g., digit '9') to pixel units in the immediate vicinity of the gaze direction (e.g., in the area of icon 706), while assigning progressively smaller weight values (e.g., digit '8', digit '7', etc.) as the spatial distance between the pixel units and the gaze direction represented by icon 706 gets larger. However, whereas this pattern was not affected by object region 708 in weight map 702-1, weight map 702-3 shows how object region 708 may be discounted in combination with the gaze-based weighting.

Specifically, weight map 702-3 shows that, along with assigning very small weight values (e.g., digits '1', '2', etc.) to pixel units near the periphery of the image frame far away from icon 706, apparatus 100 may also assign similarly small weight values to pixel units associated with object region 708 by virtue of their association with an extraneous object (e.g., rather than exclusively based on their proximity to icon 706). Specifically, pixel units that are very proximate to the gaze direction represented by icon 706 but that are inside object region 708 are shown to be assigned intermediate weight values (e.g., digits '4', '5', '6', etc.) that are smaller than comparably proximate pixel units outside object region 708 (e.g., which are assigned weight values of '8' and '9', etc.). Moreover pixel units that are included within image region 708 and are not particularly near icon 706 are shown to be assigned the smallest weight value of digit '1' even though comparably placed pixel units outside object region 708 may be assigned larger weight values (e.g., digits '3'-'7', etc.). In this way, the object depicted by pixel units within object region 708 may be discounted in a manner that accounts for real-time viewer gaze direction to some extent while still largely ignoring extraneous objects (e.g., dark instrument shafts, etc.) that may be likely to have an undesirable influence on auto-exposure management unless ignored or other discounted or accounted for.

It will be understood that weight maps determined based on other combinations of factors than those explicitly illustrated by weight maps 702 may be employed in other examples as may serve a particular implementation. For instance, in one implementation, apparatus 100 may be configured to assign weight values at operation 508 in a manner that accounts for the real-time viewer gaze direction (e.g., proximity of each pixel unit to icon 706), the centrality of each pixel unit (e.g., proximity of each pixel unit to icon 704), the relationship of each pixel unit to any extraneous objects that are to be discounted (e.g., whether each pixel unit is fully or partially located within object region 708), and/or any other combination of these factors that has not been explicitly described. In other examples additional factors may also be considered. For instance, apparatus 100 may assign weight values assigned to pixel units based on proximity to another area of focus within the image frame (e.g., other than the areas represented by icons 704 and 706) or based on criteria that are not related to the spatial position of the pixel units.

In some examples, it may be desirable for weight maps to be spatially or temporally smoothed or otherwise filtered to avoid weight values changing so quickly, from image frame to image frame, that the auto exposure management may create an undesirable flickering effect or the like. To this end, for example, apparatus 100 may filter (e.g., based on one or more weight maps associated with one or more frames in the image frame sequence), the weight values assigned to the pixel units to temporally smooth the weight values. In this way, if the viewers moves his or her eyes very briefly to one part of the image frame before moving them back (e.g., flicking from icon 706 to a point in the bottom right corner of image frame 702 and back to icon 706), the auto-exposure management might not immediately readjust the weight values to thereby significantly change the exposure characteristics for only a few frames until the viewer's eyes return to the earlier location. This filtering may provide a sense of stability to the viewer and may alleviate eye strain and fatigue that could result otherwise if the auto-exposure management changes too quickly based on every movement of the viewer's eyes.

Returning to FIG. 5, at operation 510, the output of operations 506 and 508 may be combined to form weighted pixel unit data corresponding to the pixel unit $P_i$ that is being processed. As shown, each weighted pixel unit may include data associated with a unit auto-exposure value ($V_i$), a unit auto-exposure target ($T_i$), and a weight value ($W_i$) for the pixel unit $P_i$. As will be described in more detail below, this weighted pixel unit data for each pixel unit may be used to determine frame auto-exposure data points (e.g., frame auto-exposure values and frame auto-exposure targets, etc.) in a gaze-based manner that accounts for where the viewer is focusing his or her attention in real time. Once all of the pixel units $P_i$ of the image frame (e.g., or a portion thereof, etc.) have been iterated through at operation 504, flow may proceed (Done) to operation 512.

At operation 512, apparatus 100 may determine frame auto-exposure data points such as a frame auto-exposure value ($V_F$) for the image frame and a frame auto-exposure target ($T_F$) for the image frame. For example, these frame auto-exposure data points may be determined taking into account the auto-exposure data points of each pixel unit as well as the weight values assigned to the pixel units based on the viewer's gaze direction and/or other criteria such as described above. To do this, operation 512 may be performed based on weighted pixel unit data determined and compiled at operation 510.

Figure 8:
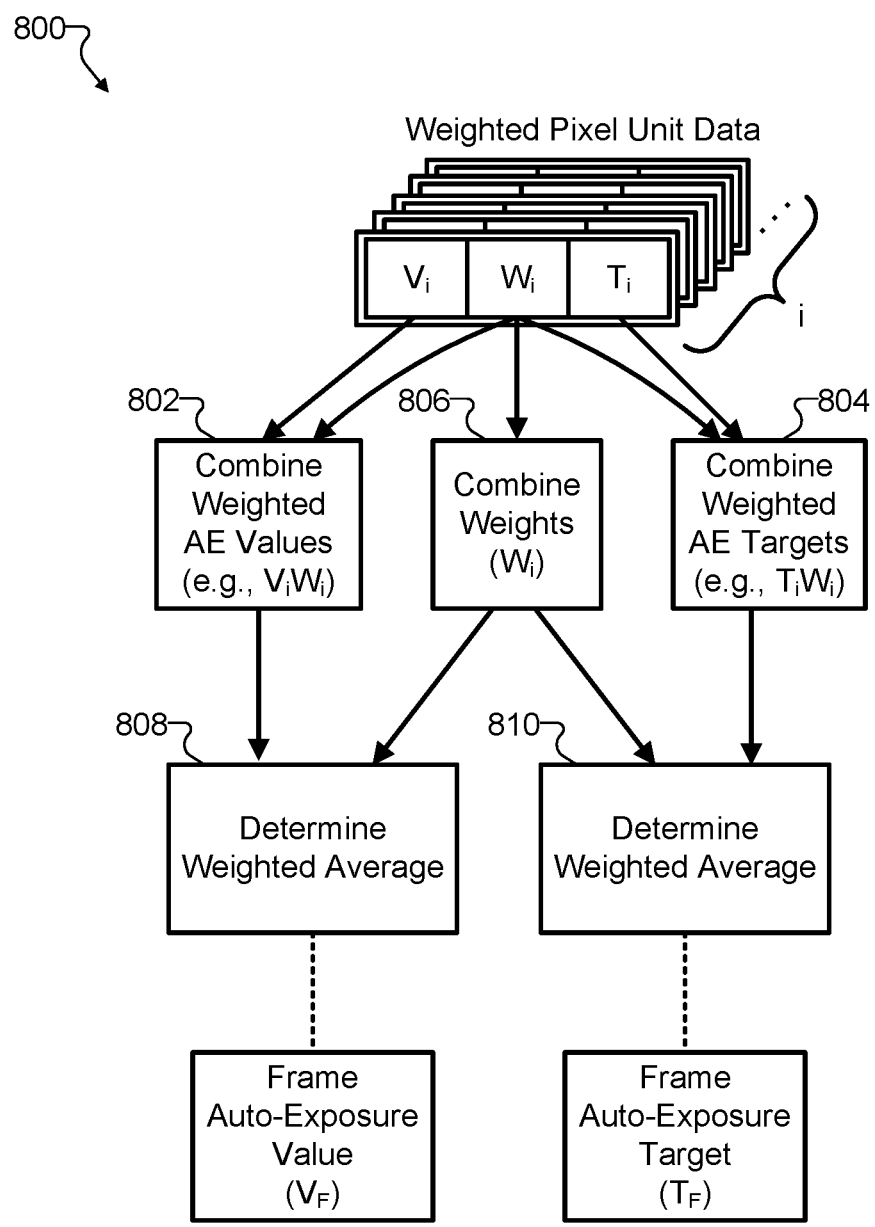
FIG. 8 shows an illustrative flow diagram for determining a frame auto-exposure value and a frame auto-exposure target based on weighted pixel unit data according to principles described herein.

To illustrate, FIG. 8 shows an illustrative flow diagram 800 for determining a frame auto-exposure value and a frame auto-exposure target at operation 512 based on weighted pixel unit data determined in the ways described above. Flow diagram 800 shows how apparatus 100 may determine a frame auto-exposure value and a frame auto-exposure target based on weighted pixel unit data determined for each pixel unit in operations 506-510. Specifically, as shown, i different instances of weighted pixel unit data (e.g., one instance for each pixel unit $P_i$ analyzed at operations 506-510) may provide input data for various operations 802-810 of flow diagram 800 to be performed so that the frame auto-exposure value ($V_F$) and the frame auto-exposure target ($T_F$) can ultimately be determined.

At operation 802, apparatus 100 may scale each unit auto-exposure value $V_i$ from each of the weighted pixel unit data instances by the corresponding weight value $W_i$ and may combine (e.g., sum, etc.) these scaled unit auto-exposure values together to form a single value. Similarly, at operation 804, apparatus 100 may scale each unit auto-exposure target $T_i$ from each of the weighted pixel unit data instances by the corresponding weight value $W_i$ and may combine (e.g., sum, etc.) these scaled unit auto-exposure targets together to form another single value. At operation 806, apparatus 100 combines each of the weight values in a similar way (e.g., summing the weight values together or the like).

At operation 808, apparatus 100 may determine the frame auto-exposure value based on the respective weight values assigned to the pixel units. For example, the frame auto-exposure value may be determined as a weighted average of the respective unit auto-exposure values. Apparatus 100 may determine the weighted average at operation 808 based on the output from operations 802 and 806 (e.g., by dividing the output of operation 802 by the output of operation 806) to form the frame auto-exposure value. In this way, the frame auto-exposure value $V_F$ may be determined in accordance with Equation 1 (where i is an index used to iterate through each weighted pixel unit data instance):

$$V_F = \frac{\Sigma_i(V_i * W_i)}{\Sigma_i(W_i)} \quad \text{(Eq. 1)}$$

At operation 810, apparatus 100 may determine the frame auto-exposure target based on the respective weight values assigned to pixel units. For example, the frame auto-exposure target may be determined as a weighted average of the respective unit auto-exposure targets. Apparatus 100 may determine the weighted average at operation 810 based on the output from operations 804 and 806 (e.g., dividing the output of operation 804 by the output of operation 806) to form the frame auto-exposure target. In this way, the frame auto-exposure value $T_F$ may be determined in accordance with Equation 2 (where i is an index used to iterate through each weighted pixel unit data instance):

$$T_F = \frac{\Sigma_i(T_i * W_i)}{\Sigma_i(W_i)} \quad \text{(Eq. 2)}$$

In other embodiments, weighted averages incorporating unit auto-exposure data points and weight values for various pixel units of the image frame may be computed in other ways to similarly prioritize certain areas (e.g., areas where the viewer is gazing in real time, central areas, non-object regions, etc.) over other areas as the auto-exposure management is performed.

Once a frame auto-exposure value has been determined at operation 808 and a frame auto-exposure target has been determined at operation 810 of FIG. 8, operation 512 of FIG. 5 may be complete and flow may proceed within flow diagram 500 to operation 514, where apparatus 100 may update auto-exposure parameters for the image capture system based on the frame auto-exposure value and/or frame auto-exposure target that have been determined. At operation 514, apparatus 100 may update (e.g., adjust or maintain) auto-exposure parameters of the image capture system in preparation for the image capture system capturing subsequent image frames in the image frame sequence.

Figure 9:
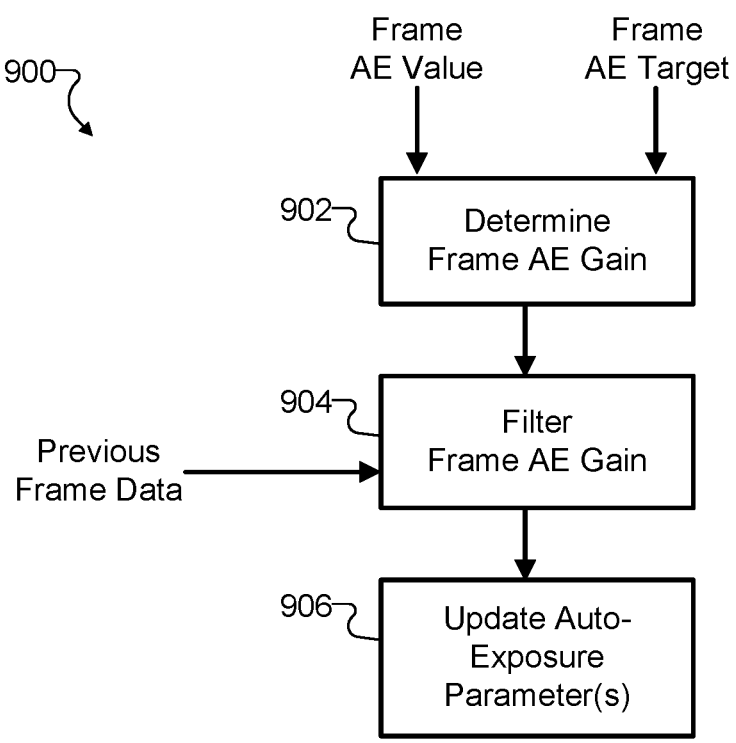
FIG. 9 shows an illustrative technique for updating an auto-exposure parameter according to principles described herein.

To illustrate, FIG. 9 shows an illustrative technique 900 for updating an auto-exposure parameter at operation 514. As shown, the frame auto-exposure value and frame auto-exposure target determined at operation 512 are used as inputs for operations shown in FIG. 9. For example, an operation 902 may receive the frame auto-exposure value and frame auto-exposure target as inputs and may use them as a basis for determining a frame auto-exposure gain. The frame auto-exposure gain may be determined to correspond to a ratio of the frame auto-exposure target to the frame auto-exposure value. In this way, if the frame auto-exposure value is already equal to the frame auto-exposure target (e.g., such that no further adjustment is needed to align to the target), the frame auto-exposure gain may be set to a gain of 1, so that the system will neither attempt to boost nor attenuate the auto-exposure values for a subsequent frame that the image capture system captures. Conversely, if the frame auto-exposure target is different from the frame auto-exposure value, the frame auto-exposure gain may be set to correspond to a value less than or greater than 1 to cause the system to either boost or attenuate the auto-exposure values for the subsequent frame in an attempt to make the auto-exposure values more closely match the desired auto-exposure target.

In the implementation of operation 902 shown in FIG. 9, the auto-exposure gain may be determined based on a frame auto-exposure value and a frame auto-exposure target that have already been determined. As has been described, for example, apparatus 100 may operate in this type of implementation by determining auto-exposure values and targets for each pixel unit into which an image frame is divided, determining a frame auto-exposure value based on the unit auto-exposure values and weight values assigned to the pixel units, determining a frame auto-exposure target based on the unit auto-exposure targets and the weight values assigned to the pixel units, and then determining a frame auto-exposure gain based on the frame auto-exposure value and the frame auto-exposure target.

As mentioned previously, however, unit auto-exposure data points may be processed in other ways in other limitations. For example, rather than determining frame auto-exposure values and targets based on individual unit auto-exposure values and targets as described above, apparatus 100 may determine auto-exposure values and targets for the pixel units into which the image frame is divided and, based on these unit auto-exposure values and targets, determine auto-exposure gains for the pixel units into which the image frame is divided (e.g., the unit auto-exposure gains $G_i$ shown in FIG. 5 and mentioned above). In these examples, apparatus 100 may determine a frame auto-exposure gain rather than a frame auto-exposure value and auto-exposure target at operation 512 (e.g., as shown by the frame auto-exposure gain $G_F$ shown in FIG. 5). For example, apparatus 100 may determine the frame auto-exposure gain as a weighted average of all the unit auto-exposure gains. This frame auto-exposure gain may be computed as a weighted average based on the unit auto-exposure gains and weight values of the respective pixel units in an analogous way as described above for determining the frame auto-exposure value and frame auto-exposure target (e.g., see Eqs. 1 and 2 above), but using the unit auto-exposure gains rather than the unit auto-exposure values and targets separately.

Once the frame auto-exposure gain is determined at operation 512 in this example, the frame auto-exposure gain determined at operation 902 may involve passing the frame auto-exposure gain determined at operation 512 to operation 904. In this way, apparatus 100 may perform the updating of the one or more auto-exposure parameters based on the auto-exposure gains for the pixel units and the weight values assigned to the pixel units, in addition or as an alternative to being based on the auto-exposure values and targets for the pixel units and the weight values assigned to the pixel units.

At operation 904, the frame auto-exposure gain may be taken as an input along with other data (e.g., other frame auto-exposure gains) determined for previous image frames in the image frame sequence. Based on these inputs, operation 904 may apply filtering to ensure that the auto-exposure gain does not change more quickly than desired and to thereby ensure that image frames presented to the user maintain a consistent brightness and change gradually. The filtering performed at operation 904 may be performed using a smoothing filter such as a temporal infinite impulse response (IIR) filter or another such digital or analog filter as may serve a particular implementation.

At operation 906, the filtered frame auto-exposure gain may be used as a basis for adjusting one or more auto-exposure parameters of the image capture system (e.g., for use by the image capture device or the illumination source to capture additional image frames). For example, as described above, adjusted auto-exposure parameters may include an exposure time parameter, a shutter aperture parameter, a luminance gain parameter, or the like. For image capture systems in which the illumination of the scene is largely or completely controlled by the image capture system (e.g., an image capture system including an endoscopic image capture device described above, an image capture system including a flash or other illumination source, etc.), adjusted auto-exposure parameters may further include an illumination intensity parameter, an illumination duration parameter, or the like.

Adjustments to the auto-exposure parameters of the image capture system may cause the image capture system to expose subsequent image frames in various different ways. For example, by adjusting the exposure time parameter, a shutter speed may be adjusted for a shutter included in the image capture system. For instance, the shutter may be held open for a longer period of time (e.g., to thereby increase the amount of exposure time of an image sensor) or for a shorter period of time (e.g., to thereby decrease the amount of exposure time for the image sensor). As another example, by adjusting the shutter aperture parameter, an aperture of the shutter may be adjusted to open more widely (e.g., to thereby increase the amount of light exposed to the image sensor) or less widely (e.g., to thereby decrease the amount of light exposed to the image sensor). As yet another example, by adjusting the luminance gain parameter, a sensitivity (e.g., an ISO sensitivity) may be increased or decreased to amplify or attenuate the illuminance as captured by the image capture system. For implementations in which the image capture system controls the illumination of the scene, the illumination intensity and/or illumination duration parameters may be adjusted to increase the intensity and duration of the light used to illuminate the scene being captured, thereby also affecting how much light the image sensor is exposed to.

Returning to FIG. 5, after the operations of flow diagram 500 have been performed, the current image frame may be considered fully processed by apparatus 100 and flow may return to operation 502, where a subsequent image frame of the image frame sequence may be obtained. The process may be repeated for the subsequent image frame and/or other subsequent image frames. It will be understood that, in certain examples, every image frame may be analyzed in accordance with flow diagram 500 to keep the auto-exposure data points (e.g., frame auto-exposure value, frame auto-exposure target, frame auto-exposure gain, etc.), and auto-exposure parameters as up-to-date as possible. In other examples, only certain image frames (e.g., every other image frame, every third image frame, etc.) may be so analyzed to conserve processing bandwidth in scenarios where more periodic auto-exposure processing still allows design specifications and targets to be achieved. It will also be understood that auto-exposure effects may tend to lag a few frames behind luminance changes at a scene, since auto-exposure parameter adjustments made based on one particular frame do not affect the exposure of that frame, but rather affect subsequent frames.

Based on any adjustments apparatus 100 makes to the auto-exposure parameters (and/or based on maintaining the auto-exposure parameters at their current levels when appropriate), apparatus 100 may successfully manage auto-exposure for image frames being captured by the image capture system, and subsequent image frames may be captured with desirable auto-exposure properties so as to have an attractive and beneficial appearance when presented to users.

As has been described, apparatus 100, method 200, and/or system 300 may each be associated in certain examples with a computer-assisted medical system used to perform a medical procedure (e.g., a surgical procedure, a diagnostic procedure, an exploratory procedure, etc.) on a body. To illustrate, FIG. 10 shows an illustrative computer-assisted medical system 1000 that may be used to perform various types of medical procedures including surgical and/or non-surgical procedures.

Figure 10:
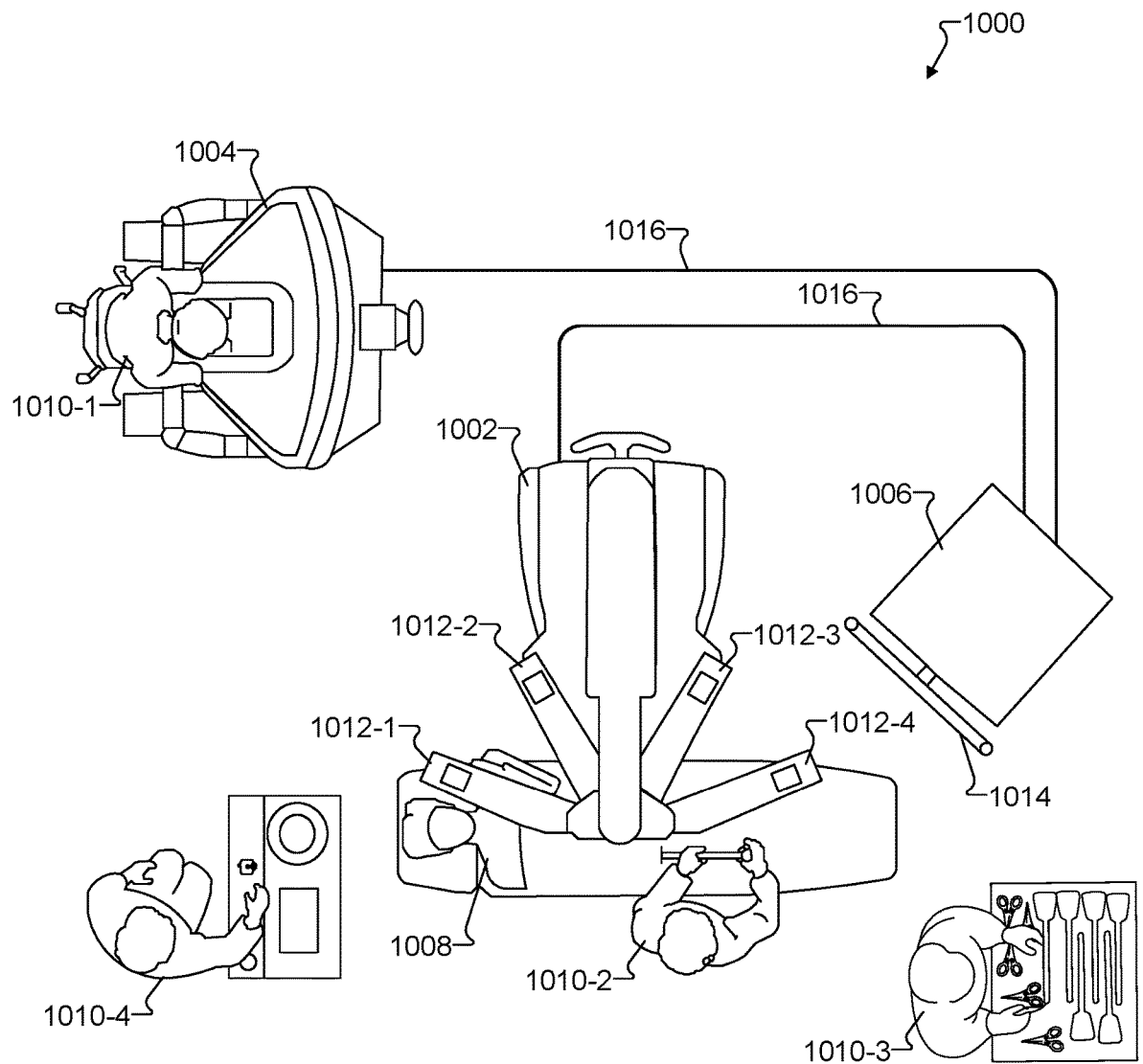
FIG. 10 shows an illustrative computer-assisted medical system according to principles described herein.

As shown, computer-assisted medical system 1000 may include a manipulator assembly 1002 (a manipulator cart is shown in FIG. 10), a user control apparatus 1004, and an auxiliary apparatus 1006, all of which are communicatively coupled to each other. Computer-assisted medical system 1000 may be utilized by a medical team to perform a computer-assisted medical procedure or other similar operation on a body of a patient 1008 or on any other body as may serve a particular implementation. As shown, the medical team may include a first user 1010-1 (such as a surgeon for a surgical procedure), a second user 1010-2 (such as a patient-side assistant), a third user 1010-3 (such as another assistant, a nurse, a trainee, etc.), and a fourth user 1010-4 (such as an anesthesiologist for a surgical procedure), all of whom may be collectively referred to as users 1010, and each of whom may control, interact with, or otherwise be a user of computer-assisted medical system 1000. More, fewer, or alternative users may be present during a medical procedure as may serve a particular implementation. For example, team composition for different medical procedures, or for non-medical procedures, may differ and include users with different roles.

While FIG. 10 illustrates an ongoing minimally invasive medical procedure such as a minimally invasive surgical procedure, it will be understood that computer-assisted medical system 1000 may similarly be used to perform open medical procedures or other types of operations. For example, operations such as exploratory imaging operations, mock medical procedures used for training purposes, and/or other operations may also be performed.

As shown in FIG. 10, manipulator assembly 1002 may include one or more manipulator arms 1012 (e.g., manipulator arms 1012-1 through 1012-4) to which one or more instruments may be coupled. The instruments may be used for a computer-assisted medical procedure on patient 1008 (e.g., in a surgical example, by being at least partially inserted into patient 1008 and manipulated within patient 1008). While manipulator assembly 1002 is depicted and described herein as including four manipulator arms 1012, it will be recognized that manipulator assembly 1002 may include a single manipulator arm 1012 or any other number of manipulator arms as may serve a particular implementation. While the example of FIG. 10 illustrates manipulator arms 1012 as being robotic manipulator arms, it will be understood that, in some examples, one or more instruments may be partially or entirely manually controlled, such as by being handheld and controlled manually by a person. For instance, these partially or entirely manually controlled instruments may be used in conjunction with, or as an alternative to, computer-assisted instrumentation that is coupled to manipulator arms 1012 shown in FIG. 10.

During the medical operation, user control apparatus 1004 may be configured to facilitate teleoperational control by user 1010-1 of manipulator arms 1012 and instruments attached to manipulator arms 1012. To this end, user control apparatus 1004 may provide user 1010-1 with imagery of an operational area associated with patient 1008 as captured by an imaging device. To facilitate control of instruments, user control apparatus 1004 may include a set of master controls. These master controls may be manipulated by user 1010-1 to control movement of the manipulator arms 1012 or any instruments coupled to manipulator arms 1012.

Auxiliary apparatus 1006 may include one or more computing devices configured to perform auxiliary functions in support of the medical procedure, such as providing insufflation, electrocautery energy, illumination or other energy for imaging devices, image processing, or coordinating components of computer-assisted medical system 1000. In some examples, auxiliary apparatus 1006 may be configured with a display monitor 1014 configured to display one or more user interfaces, or graphical or textual information in support of the medical procedure. In some instances, display monitor 1014 may be implemented by a touchscreen display and provide user input functionality.

As will be described in more detail below, apparatus 100 may be implemented within or may operate in conjunction with computer-assisted medical system 1000. For instance, in certain implementations, apparatus 100 may be implemented by computing resources included within an instrument (e.g., an endoscopic or other imaging instrument) attached to one of manipulator arms 1012, or by computing resources associated with manipulator assembly 1002, user control apparatus 1004, auxiliary apparatus 1006, or another system component not explicitly shown in FIG. 10.

Manipulator assembly 1002, user control apparatus 1004, and auxiliary apparatus 1006 may be communicatively coupled one to another in any suitable manner. For example, as shown in FIG. 10, manipulator assembly 1002, user control apparatus 1004, and auxiliary apparatus 1006 may be communicatively coupled by way of control lines 1016, which may represent any wired or wireless communication link as may serve a particular implementation. To this end, manipulator assembly 1002, user control apparatus 1004, and auxiliary apparatus 1006 may each include one or more wired or wireless communication interfaces, such as one or more local area network interfaces, Wi-Fi network interfaces, cellular interfaces, and so forth.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 11:
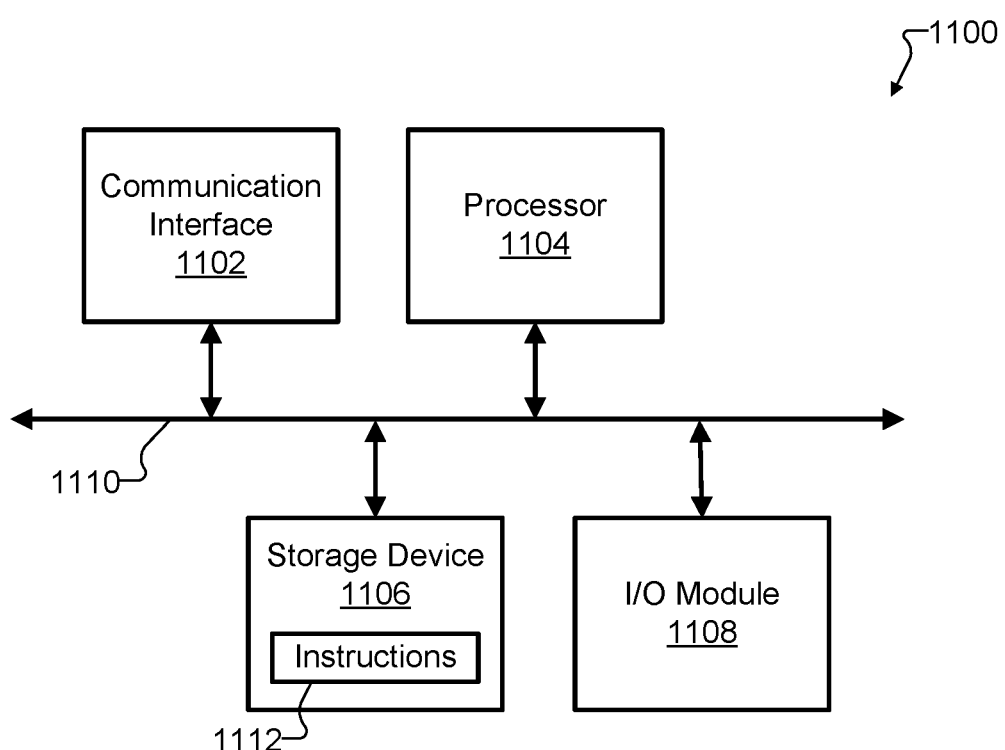
FIG. 11 shows an illustrative computing system according to principles described herein.

FIG. 11 shows an illustrative computing system 1100 that may be specifically configured to perform one or more of the processes described herein. For example, computing system 1100 may include or implement (or partially implement) a gaze-based auto-exposure management apparatus such as apparatus 100, a gaze-based auto-exposure management system such as system 300, or any other computing systems or devices described herein.

As shown in FIG. 11, computing system 1100 may include a communication interface 1102, a processor 1104, a storage device 1106, and an input/output ("I/O") module 1108 communicatively connected via a communication infrastructure 1110. While an illustrative computing system 1100 is shown in FIG. 11, the components illustrated in FIG. 11 are not intended to be limiting. Additional or alternative components may be used in other embodiments. Components of computing system 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1100. For example, one or more applications 1112 residing within storage device 1106 may be configured to direct processor 1104 to perform one or more processes or functions associated with processor 104 of apparatus 100. Likewise, memory 102 of apparatus 100 may be implemented by or within storage device 1106.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An apparatus comprising:
one or more processors; and
memory storing executable instructions that, when executed by the one or more processors, cause the apparatus to:
  determine, for an image frame within an image frame sequence captured by an image capture system, auto-exposure values for pixel units into which the image frame is divided;
  assign, based on a gaze direction of a viewer viewing the image frame sequence, weight values to the pixel units; and
  update, based on the auto-exposure values determined for the pixel units and the weight values assigned to the pixel units, one or more auto-exposure parameters for use by the image capture system to capture an additional image frame within the image frame sequence.

2. The apparatus of claim 1, wherein the gaze direction upon which the assigning the weight values to the pixel units is based is a real-time gaze direction of the viewer that is continuously updated as the viewer views the image frame sequence in real time.

3. The apparatus of claim 1, wherein the assigning the weight values to the pixel units is performed further based on a centrality of a respective position of each of the pixel units within the image frame.

4. The apparatus of claim 1, wherein the assigning the weight values to the pixel units is performed further based on a position of an object with respect to environmental imagery of a scene depicted by the image frame as the position of the object is tracked by an object tracking system.

5. The apparatus of claim 1, wherein the instructions, when executed by the one or more processors, cause the apparatus to filter, based on one or more weight values associated with one or more frames in the image frame sequence, the weight values assigned to the pixel units to temporally smooth the weight values.

6. The apparatus of claim 1, wherein the pixel units into which the image frame is divided are uniformly distributed in rows and columns to form a grid.

7. The apparatus of claim 6, wherein the grid covers a region of interest of the image frame less than an entirety of the image frame.

8. The apparatus of claim 1, wherein each of the pixel units into which the image frame is divided includes an individual pixel.

9. The apparatus of claim 1, wherein each of the pixel units into which the image frame is divided includes a grouping of adjacent pixels.

10. The apparatus of claim 1, wherein:
the image capture system includes an endoscopic image capture device configured to capture the image frame sequence during a performance of a medical procedure on a body; and
the viewer viewing the image frame sequence is a user assisting in the performance of the medical procedure.

11. The apparatus of claim 1, wherein:
the instructions, when executed by the one or more processors, cause the apparatus to:
  determine auto-exposure targets for the pixel units into which the image frame is divided, and
  determine, based on the auto-exposure values and auto-exposure targets for the pixel units into which the image frame is divided, auto-exposure gains for the pixel units into which the image frame is divided; and the updating the one or more auto-exposure parameters is based on the auto-exposure gains for the pixel units and the weight values assigned to the pixel units.

12. The apparatus of claim 1, wherein:
the instructions, when executed by the one or more processors, cause the apparatus to:
determine auto-exposure targets for the pixel units into which the image frame is divided,
determine, based on the auto-exposure values determined for the pixel units and the weight values assigned to the pixel units, a frame auto-exposure value for the image frame,
determine, based on the auto-exposure targets determined for the pixel units and the weight values assigned to the pixel units, a frame auto-exposure target for the image frame, and
determine, based on the frame auto-exposure value and the frame auto-exposure target, a frame auto-exposure gain; and
the updating the one or more auto-exposure parameters includes updating the one or more auto-exposure parameters based on the frame auto-exposure gain.

13. The apparatus of claim 12, wherein:
the instructions, when executed by the one or more processors, cause the apparatus to filter, using a smoothing filter and based on one or more frame auto-exposure parameter gains associated with one or more image frames in the image frame sequence, the frame auto-exposure gain; and
the updating the one or more auto-exposure parameters is based on the filtered frame auto-exposure gain.

14. The apparatus of claim 1, wherein the one or more auto-exposure parameters include one or more of:
an exposure time parameter;
a shutter aperture parameter;
an illumination intensity parameter; or
a luminance gain parameter.

15. A system comprising:
an illumination source configured to illuminate tissue within a body during a performance of a medical procedure performed by a user;
an image capture device configured to capture an image frame sequence during the performance of the medical procedure, the image frame sequence including an image frame depicting an internal view of the body that features the tissue illuminated by the illumination source; and
one or more processors configured to:
determine auto-exposure values and auto-exposure targets for pixel units into which the image frame is divided;
assign, based on a gaze direction of the user as the user views the image frame sequence, weight values to the pixel units; and
update, based on the auto-exposure values and the auto-exposure targets determined for the pixel units and the weight values assigned to the pixel units, one or more auto-exposure parameters for use by the image capture device or the illumination source to capture an additional image frame within the image frame sequence.

16. The system of claim 15, wherein the assigning the weight values to the pixel units is performed further based on a centrality of a respective position of each of the pixel units within the image frame.

17. The system of claim 15, wherein the assigning the weight values to the pixel units is performed further based on a position of an object with respect to environmental imagery of a scene depicted by the image frame as the position of the object is tracked by an object tracking system.

18. A method comprising:
determining, by a computing device and for an image frame within an image frame sequence captured by an image capture system, auto-exposure values and auto-exposure targets for pixel units into which the image frame is divided;
assigning, by the computing device based on a gaze direction of a viewer viewing the image frame sequence, weight values to the pixel units; and
updating, by the computing device and based on the auto-exposure values and the auto-exposure targets determined for the pixel units and the weight values assigned to the pixel units, one or more auto-exposure parameters for use by the image capture system to capture an additional image frame within the image frame sequence.

19. The method of claim 18, wherein the gaze direction upon which the assigning the weight values to the pixel units is based is a real-time gaze direction of the viewer that is continuously updated as the viewer views the image frame sequence in real time.

20. The method of claim 18, wherein the assigning the weight values to the pixel units is performed further based on a centrality of a respective position of each of the pixel units within the image frame.

* * * * *